United States Patent
Kinzer et al.

(10) Patent No.: US 8,366,529 B2
(45) Date of Patent: *Feb. 5, 2013

(54) GAME IN WHICH CLIPS ARE STORED ON A DVD AND PLAYED DURING THE COURSE OF THE GAME

(75) Inventors: Craig E. Kinzer, Issaquah, WA (US); David Long, Issaquah, WA (US); William Kuper, Seattle, WA (US); Trevor Steinthal, Seattle, WA (US); Mathew J. Griesse, Seattle, WA (US); John Hendricks, Seattle, WA (US); William J. Patterson, Carnation, WA (US); Michael J. Ausich, Seattle, WA (US)

(73) Assignee: Screenlife, LLC, Los Angeles, CA (US)

( * ) Notice: Subject to any disclaimer, the term of this patent is extended or adjusted under 35 U.S.C. 154(b) by 1211 days.

This patent is subject to a terminal disclaimer.

(21) Appl. No.: 11/562,967

(22) Filed: Nov. 22, 2006

(65) Prior Publication Data

US 2007/0087803 A1    Apr. 19, 2007

Related U.S. Application Data

(63) Continuation of application No. 10/438,174, filed on May 13, 2003, now Pat. No. 7,223,170.

(60) Provisional application No. 60/413,627, filed on Sep. 25, 2002, provisional application No. 60/380,764, filed on May 14, 2002.

(51) Int. Cl.
*A63F 9/24* (2006.01)

(52) U.S. Cl. .................. 463/9; 463/22; 463/23

(58) Field of Classification Search ............... 463/9, 16, 463/43, 25, 13, 10, 22, 23, 29, 30, 31
See application file for complete search history.

(56) References Cited

U.S. PATENT DOCUMENTS

| 4,940,239 A | * | 7/1990 | Tuttle ........................... 273/243 |
| 4,944,519 A | | 7/1990 | Canela |
| 5,120,230 A | | 6/1992 | Clark et al. |

(Continued)

FOREIGN PATENT DOCUMENTS

| EP | 1 147 793 A2 | 10/2001 |
| EP | 1 180 385 A2 | 2/2002 |

(Continued)

OTHER PUBLICATIONS

Taylor, J., *DVD Demystified*, 2d ed., McGraw-Hill, New York, 2001, 1998, Chap. 6-7, pp. 250-352.

(Continued)

*Primary Examiner* — David L Lewis
*Assistant Examiner* — Chase Leichliter
(74) *Attorney, Agent, or Firm* — Christensen O'Connor Johnson Kindness PLLC

(57) ABSTRACT

A media game that employs a method for randomly shuffling through a large set of video and/or audio clips stored on readable media using a media player, such as a DVD player, is disclosed. In addition to the readable media, the game also includes a game board, moveable play pieces, trivia question cards, random name cards, a numbered die, and a challenge die. The game board can be converted from long play to short play by lifting the endmost sections of the game board and placing them next to each other on top of intermediate sections of the game board. A path circumnavigates the game board and appears to be continuous in both long and short play modes. The begin and end regions reside at least partially on the endmost sections and appear as unbroken shapes when configured for both long and short play.

27 Claims, 29 Drawing Sheets

U.S. PATENT DOCUMENTS

| | | | |
|---|---|---|---|
| 5,121,928 A | | 6/1992 | Salerno-Sonneberg |
| 5,145,184 A | * | 9/1992 | Yearick et al. ............... 273/248 |
| 5,255,923 A | * | 10/1993 | Bennett ........................ 273/284 |
| 5,393,071 A | | 2/1995 | Best |
| 5,393,072 A | | 2/1995 | Best |
| 5,393,073 A | | 2/1995 | Best |
| 5,472,207 A | * | 12/1995 | Sullivan et al. ............... 273/249 |
| 5,613,909 A | | 3/1997 | Stelovsky |
| 5,643,084 A | | 7/1997 | Mirsky |
| 5,697,844 A | | 12/1997 | Von Kohorn |
| 5,734,788 A | | 3/1998 | Nonomura et al. |
| 5,782,692 A | | 7/1998 | Stelovsky |
| 5,929,857 A | | 7/1999 | Dinallo et al. |
| 5,933,569 A | | 8/1999 | Sawabe et al. |
| 5,986,200 A | | 11/1999 | Curtin |
| 5,999,698 A | | 12/1999 | Nakai et al. |
| 6,065,006 A | | 5/2000 | deCarmo et al. |
| 6,085,021 A | | 7/2000 | Tozaki et al. |
| 6,122,434 A | | 9/2000 | Sawabe et al. |
| 6,133,920 A | | 10/2000 | deCarmo et al. |
| 6,138,175 A | | 10/2000 | deCarmo |
| 6,159,014 A | | 12/2000 | Jenkins et al. |
| 6,201,928 B1 | | 3/2001 | Nonomura et al. |
| 6,215,952 B1 | * | 4/2001 | Yoshio et al. ................... 386/94 |
| 6,229,523 B1 | | 5/2001 | Czako |
| 6,229,952 B1 | | 5/2001 | Nonomura et al. |
| 6,243,328 B1 | | 6/2001 | Fenner et al. |
| 6,256,730 B1 | | 7/2001 | deCarmo |
| 6,272,625 B1 | | 8/2001 | deCarmo |
| 6,356,703 B1 | | 3/2002 | Nonomura et al. |
| 6,356,914 B1 | | 3/2002 | deCarmo et al. |
| 6,381,314 B1 | | 4/2002 | Walinski |
| 6,381,404 B1 | | 4/2002 | deCarmo |
| 6,419,232 B1 | | 7/2002 | Sturdevant, II |
| 6,434,326 B1 | | 8/2002 | Kondo et al. |
| 6,493,005 B1 | | 12/2002 | Wu |
| 6,493,503 B2 | | 12/2002 | Nonomura et al. |
| 6,496,981 B1 | * | 12/2002 | Wistendahl et al. .......... 725/112 |
| 6,504,649 B1 | | 1/2003 | Myers |
| 6,507,696 B1 | | 1/2003 | Chung |
| 6,526,223 B1 | | 2/2003 | Mori et al. |
| 6,529,683 B2 | | 3/2003 | Mori et al. |
| 6,553,180 B1 | | 4/2003 | Kikuchi et al. |
| 6,564,006 B1 | | 5/2003 | Mori et al. |
| 6,567,608 B2 | | 5/2003 | Mori et al. |
| 6,567,979 B1 | | 5/2003 | deCarmo |
| 6,574,419 B1 | | 6/2003 | Nonomura et al. |
| 6,594,212 B2 | | 7/2003 | Kimura et al. |
| 6,643,450 B1 | | 11/2003 | deCarmo |
| 6,650,827 B1 | | 11/2003 | Ogikubo et al. |
| 6,708,334 B1 | | 3/2004 | deCarmo et al. |
| 6,758,754 B1 | * | 7/2004 | Lavanchy et al. ............... 463/42 |
| 6,760,915 B2 | | 7/2004 | deCarmo |
| 6,761,635 B2 | | 7/2004 | Hoshino et al. |
| 6,790,138 B1 | | 9/2004 | Erlichman |
| 6,807,368 B1 | | 10/2004 | deCarmo |
| 6,816,667 B1 | | 11/2004 | deCarmo |
| 6,987,925 B2 | | 1/2006 | Kinzer et al. |
| 7,010,213 B2 | | 3/2006 | Yeend |
| 7,496,086 B2 | * | 2/2009 | Eckberg ........................ 370/352 |
| 2002/0010026 A1 | | 1/2002 | York |
| 2002/0097984 A1 | | 7/2002 | Abecassis |
| 2003/0054877 A1 | | 3/2003 | Baerlocher |
| 2003/0190961 A1 | * | 10/2003 | Seidman ........................ 463/43 |
| 2004/0014524 A1 | * | 1/2004 | Pearlman ........................ 463/30 |
| 2004/0048642 A1 | | 3/2004 | Kinzer |
| 2004/0239028 A1 | | 12/2004 | Schnitman |
| 2004/0240861 A1 | * | 12/2004 | Yeend et al. .................. 386/125 |
| 2004/0255328 A1 | | 12/2004 | Baldwin |
| 2005/0008338 A1 | | 1/2005 | Yamauchi |
| 2005/0008348 A1 | * | 1/2005 | Collar et al. .................. 386/125 |
| 2005/0014563 A1 | | 1/2005 | Barri |
| 2005/0075166 A1 | | 4/2005 | Hemstreet |
| 2005/0117055 A1 | | 6/2005 | Kerofsky |
| 2005/0215324 A1 | | 9/2005 | Lippincott |
| 2005/0227764 A1 | | 10/2005 | Cantu |
| 2006/0044216 A1 | | 3/2006 | Love |
| 2006/0146029 A1 | | 7/2006 | Diercks |
| 2006/0246988 A1 | | 11/2006 | Walker |
| 2007/0066404 A1 | | 3/2007 | Leong |
| 2007/0180387 A1 | | 8/2007 | Gravina |
| 2007/0205912 A1 | | 9/2007 | Lane |
| 2007/0229472 A1 | | 10/2007 | Bytheway |
| 2008/0268955 A1 | | 10/2008 | Spittle |

FOREIGN PATENT DOCUMENTS

| | | |
|---|---|---|
| GB | 2 219 217 A | 12/1989 |
| JP | 05-199415 | 8/1993 |
| JP | 07-320458 | 12/1995 |
| JP | 10-283761 | 10/1998 |
| JP | 11-151357 | 6/1999 |
| JP | 2000-306371 | 11/2000 |
| JP | 2003-536299 | 12/2003 |
| WO | WO 90/00429 A1 | 1/1990 |
| WO | WO 97/34671 A | 9/1997 |
| WO | WO 02/20108 A2 | 3/2002 |

OTHER PUBLICATIONS

"DVD Frequently Asked Questions (and Answers)," DVD Demystified: Home of the DVD FAQ, Jan. 4, 2008, <http://www.dvddemystified.com/dvdfaq.html> [retrieved Apr. 18, 2008], pp. 1-5 and 8-10.

LaBarge, R., "DVD Authoring & Production: An Authoritative Guide to DVD-Video, DVD-ROM, & WebDVD," CMP Books, Lawrence, Kansas, 2001, Chap. 2, "DVD Format Specifications," pp. 7-9, 16-18, and 36-38.

Taylor, J., "DVD Demystified," 2nd ed., McGraw-Hill, New York, 2001, Chap. 1, "What Is DVD?" pp. 4-5.

"Digital Leisure Releases Dragon's Lair DVD-Video; One of the Best-Selling Arcade Games of All Time Now Available for DVD Movie Players," Business Wire, Nov. 6, 1998, HighBeam Research (online),<www.highbeam.com/doc/1G1-53183585.html> [retrieved Sep. 10, 2010], 1 page.

* cited by examiner

| CURRENT CLIP | JUMP |
|---|---|
| 1 | 1 |
| 31 | 1 |
| 61 | 1 |
| 91 | 1 |
| 121 | 1 |
| 151 | 1 |
| 181 | 1 |
| 16 | 1 |
| 46 | 1 |
| 76 | 1 |
| 106 | 1 |
| 136 | 1 |
| 166 | 1 |
| 196 | 1 |
| 126 | 1 |

*Fig.23A.*

| CURRENT CLIP | JUMP |
|---|---|
| 1 | 1 |
| 239 | 238 |
| 31 | 1 |
| 209 | 238 |
| 61 | 1 |
| 179 | 238 |
| 91 | 1 |
| 16 | 1 |
| 224 | 238 |
| 46 | 1 |
| 194 | 238 |
| 76 | 1 |
| 164 | 238 |
| 106 | 1 |

*Fig.23B.*

GAME IN WHICH CLIPS ARE STORED ON A DVD AND PLAYED DURING THE COURSE OF THE GAME

CROSS-REFERENCES TO RELATED APPLICATIONS

This application is a continuation of patent application Ser. No. 10/438,174, filed May 13, 2003, which claims the benefit of the filing dates of Provisional Patent Application No. 60/380,764, filed May 14, 2002, and Provisional Patent Application No. 60/413,627, filed Sep. 25, 2002, the subject matter of which is also incorporated herein by reference.

BACKGROUND

While the present invention was developed for use in games, and is described in the context of a game environment, in particular a game employing video and/or sound clips, visual and/or auditory content and still pictures or text, as will be better understood from the following description, certain features and aspects of the invention may find use in other environments, including, but not limited to, other game environments and educational, training, and promotional environments.

In the past, games about movies or other subject matter that can be visually and/or auditorially displayed, such as video-recorded sports events, have involved asking a player or group of players questions concerning the movie or other video subject matter without any direct viewing of a clip of the movie or other video subject matter. Past games involving visually displayable subject matter, e.g., movies, sporting events, news events, were not as enjoyable as they could have been because they failed to incorporate visual images of the subject matter, i.e., video clips, in an acceptable manner. While previous movie games could have employed media players, such as DVD players and video cassette players, to play clips during a game, they would have had to play the clips in a sequential, hence predictable, manner. While playing such a game for the first time presents new questions, repeated play becomes predictable and eliminates the enjoyment and surprise that should accompany a good game (or educational, training, or promotional tool).

DVD players have an advantage over video cassette players in that DVD players can quickly and accurately access specific segments of data anywhere on the medium. However, due to the limited programmable abilities of DVD players, it has been generally assumed that DVD players are incapable of randomly shuffling through a large number of video and/or sound clips without repeating a clip. Random shuffling, of course, is one of the keys to success in any game that generates information, such as movie scenes or other video clips, and asks the players questions about the generated information.

There are many obstacles to programming random shuffling into DVD players. DVD players are unlike computers equipped with DVD-ROMs. Computers have available highly programmable CPUs, large storage capacity (both in memory and on disc), and are capable of generating very good random numbers. In contrast, DVD players provide only a limited set of programmable abilities, have minimal storage capacity, and while all DVD players must provide a random number generator, many are incapable of generating usable random numbers. For instance, some random number generators in DVD players give definite "weight" to certain numbers, mostly ones. However, even when DVD players can generate good random numbers, DVD players only provide a limited number of, usually 16, general registers for storage. While a DVD player may be able to track which of a few clips have previously been selected, thereby ensuring that all clips are eventually selected without repeats, tracking more than the available number of general register (e.g., 16) clips has been assumed to be beyond a DVD player's ability.

The present invention is directed to solving the foregoing and other limitations and problems of games and educational, training, and promotional tools employing DVD players.

DEFINITION OF KEY TERMS

As used in the following description, "shuffling" clips is analogous to shuffling cards. Shuffling cards involves mixing up the order of the cards in a deck of cards. After a deck of cards is shuffled, individual cards taken from the top of the deck appear in random order, without any repeats. In the same manner, shuffling video and/or sound clips involves mixing the order of the clips such that individual clips appear randomly selected and played, without any repeats. While a DVD player cannot physically alter the order of the clips on a disc, the game described herein provides a way of selecting clips in a random order, without repeats. Thus, the clips are said to be shuffled, or randomly shuffled. As will be readily appreciated by those skilled in the art and others, video and/or sound clips ("clips") include, without limitation, movie segments, still pictures, text, sounds (including voice) etc., in effect any visual or auditory content recordable on a DVD for playback.

The modulo function, as used in the following description, refers to a particular application of whole integer division. As an example, using whole integer division, 3 divided by 10 is 0 with a remainder of 3. The modulo function focuses on the remainder of a whole integer division, and the result of the modulo function is the remainder after a whole integer division. Thus, 3 modulo 10 is 3. As another example, 17 modulo 10 is 7. As will be described below, by using the modulo function with a prime number as the divisor of the integer division (this prime number corresponding to the number of clips in a clip table), a DVD player is able to randomly shuffle through a large set of clips.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with the present invention, a DVD game is provided. The game is played in conjunction with a media player, preferably a DVD player, connected to a display device. The game includes a game board, movable player pieces, trivia question cards, random move cards, a numbered die, a challenge die, and a media player readable disc.

The game board, player pieces, trivia question cards, and random move cards are set up for play. An order of play among the players is determined for the game. The disc is inserted into the media, i.e., DVD player, whereupon the media player is initialized for playing the game.

Game play is commenced according to the previously determined order. Play begins with the first player in the previously determined order. Except as otherwise directed by the rules of the game, for each turn, the player whose turn it is rolls both dies. The player moves his associated player piece according to the number showing on the top of the numbered die. The player then responds to a challenge according to the challenge showing on the top of the challenge die. If the player correctly responds to the challenge, the player continues the turn by repeating with rolling both dies. However, if the player fails to correctly respond to the challenge, the turn passes to the next player in the previously determined order. The first player's turn follows the last player's turn. The rotation of turns continues until a player wins the game, or as otherwise directed by the rules of the game. A player wins the game when the player correctly responds to a challenge while at a game position designated for winning the game.

In accordance with further aspects of the invention, a game board for both long and short play is provided. The game board is comprised of a plurality of sections hingedly joined together. The game board is in a long play form when the hinged sections lie flat and a short play form when the hinged sections are folded over.

In accordance with additional aspects of this invention, the game board includes a continuous path joining a begin region and an end region, the path being longer when the board is in the long play configuration and shorter when in the short play configuration.

In accordance with further aspects of this invention, the game board includes five sections, two end sections, two intermediate sections and a center section joined in seriatim by flexible hinges.

In accordance with still other aspects of this invention, the game board is sized and foldable such that all five sections lie in a common plane when the game board is in the long play configuration and folded in an accordion manner such that the intermediate sections overlie the center section and the end sections overlie the intermediate sections when the game board is in the short play configuration.

In accordance with other aspects of the invention, a media, i.e., DVD, player readable disc having executable instructions for playing a media game on a media player is provided. In response to player input (via a remote control or other media player control input), the media player plays a randomly selected clip stored on the disc. The disc includes at least one clip table containing clips. Alternatively, the at least one clip table is a table of references to clips stored elsewhere on the medium. Each clip table has a prime number of entries, meaning that the number of entries per each clip table is a prime number.

In accordance with additional aspects of the present invention, a method for randomly shuffling through a set of objects, such as a table of clips for playing, without repeats and without tracking objects (i.e., clips) that have already played, is provided. In one form, first, a current clip value, which references a clip in a set, and a jump value are initialized. Then a clip in the set referenced by the current clip value is selected and played. Thereafter, the sum of the current clip value and the jump value is divided by the number of clips in the set. The remainder is saved as the current clip value. The selecting, playing, dividing and saving sequence is then repeated. The number of clips in the set and the jump value are such that the clips are selected and played without repeating any clip in the set.

In accordance with yet other aspects of this invention, the size of the set of objects, i.e., the clip table is a prime number. The jump value is a randomly generated value between one and the table size minus one, inclusive and the current clip value is randomly generated between one and the table size, inclusive.

In accordance with yet still other aspects of this invention, for each clip in the table: (1) the clip at the ordinal position in the table corresponding to the current clip value is played; (2) the jump value is added to the current clip value; (3) the modulo function is applied to the sum of the jump value and current clip value with the table size as the divisor; and (4) the result of the modulo function is saved as the current clip value.

In accordance with yet other aspects of this invention, a method and readable medium for generating a plurality of initial table entries, each entry comprising a current clip value and a jump value useful by a player to select clips from a set of clips to play during a session without repeating the selection of any clip during the session and without tracking which clips have been selected is provided. In one form, first, the number of entries to be entered into an initial values table is determined by dividing the number clips in a set of clips by a predetermined maximum number of clip selections per session. Then, a plurality of non-overlapping regions in the set of clips corresponding to the number of entries to be entered into the initial values table are identified. Next, for each identified non-overlapping region, the starting position for the regions is obtained, the obtained starting position is stored in the initial values table as the corresponding entry's current clip value and a corresponding entry's jump value is initialized. The corresponding jump value causes the player to iterate through the clips in the set of clips beginning with the starting position.

As will be readily appreciated from the foregoing description, the invention provides a media game, in particular, a DVD game, that overcomes some, if not all, of the disadvantages of games employing media players described above. While various elements of the media game, including, but not limited to, the game board, the media player readable disc and the methods of randomly shuffling through a table of clips for playing or a set of objects for processing, are ideally suited for use in the media game, as those skilled in the art and others will readily appreciate, these elements and others may find use in other environments, including, but not limited to, other game environments and educational, training, and promotional environments.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

The foregoing aspects and many of the attendant advantages of this invention will become more readily appreciated as the same become better understood by reference to the following detailed description, when taken in conjunction with the accompanying drawings, wherein:

FIGS. 1A and 1B are block diagrams illustrating exemplary video clip tables stored on a DVD-disc according to the present invention;

FIGS. 23A and 23B are block diagrams illustrating exemplary initial value tables generated according to the generate initial values table routine of FIG. 22;

DETAILED DESCRIPTION

Figure 1:
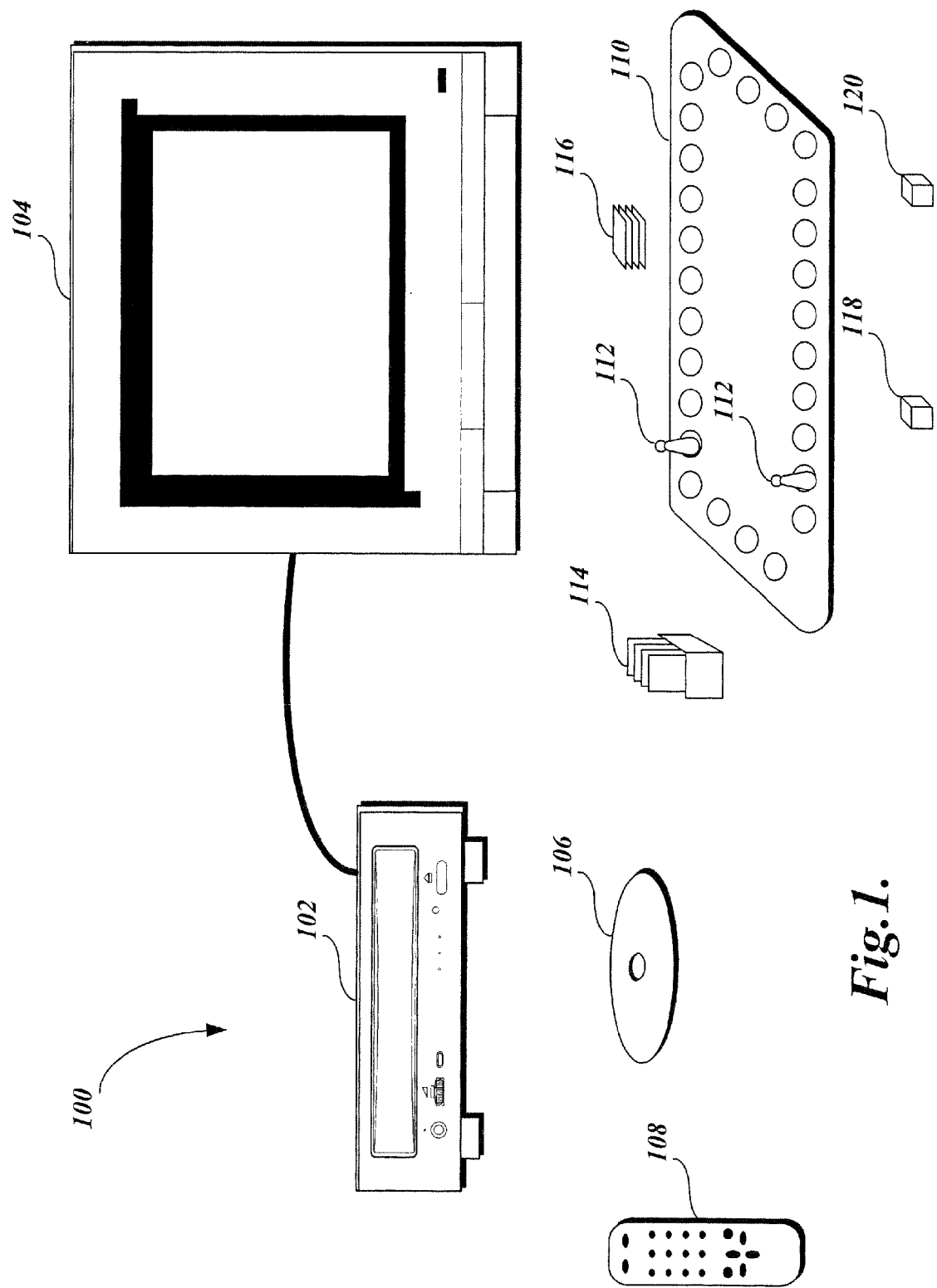
FIG. 1 is a block diagram illustrating the elements of an exemplary DVD game system formed in accordance with the present invention.

FIG. 1 is a block diagram illustrative of an exemplary DVD game system 100 formed in accordance with the present invention. While the illustrated exemplary DVD game system 100 is a parlor-type game and described herein as a parlor-type game, it is to be understood that the game could also take the form of an education, training, or promotional tool. Thus, as used herein, game, like clip, should be construed as exemplary, not limiting.

The illustrated DVD game system 100 includes a DVD player 102 connected to a display device 104. As well known to those skilled in the art, a DVD player, or more accurately, a DVD-Video player, is a device whose functionality is defined by a DVD-Video specification developed by DVD player manufacturers. The DVD game system 100 also includes a digital video disc (DVD) 106, or more accurately, a DVD-Video disc, containing clips to be played (video clips to be displayed and/or sound to be emitted) when playing a game. A DVD player remote control 108 enables players to control the play of the game according to the instructions displayed on the display device 104 by the DVD player 102. The illustrative, exemplary DVD game system 100 also includes a game board 110, movable player pieces 112, a set of trivia question cards 114, a set of random move cards 116, a numbered die 118, and a challenge die 120.

An alternative exemplary game system does not include a DVD player remote control 108; rather, the DVD player 102 may include the necessary controls on the DVD player itself. In such systems, players control the DVD player 102 without the use of the remote control 108. As a further alternative, both types of DVD controls are provided, i.e., DVD player controls and a DVD player remote control 108.

A further alternative game system does not include the game board 110, the moveable player pieces 112, the trivia question cards 114, the random move cards 116, the numbered die 118, and challenge die 120. Rather, the functions provided by these elements are provided by the DVD 106 and playing of the game is conducted entirely through the DVD player 102, the DVD 106, and the display device 104 and, normally, the DVD player remote control 108.

Those skilled in the art will appreciate that a DVD-ROM or other DVD playing device may be substituted for the DVD player 102. However, it should be noted that one feature of the game described herein is directed toward using the limited capabilities of a DVD player. Those skilled in the art will appreciate that typically accompanying DVD-ROMs is a personal computer PC that is capable of generating random numbers and shuffling through a set of clips without relying on the limited set of functions available to a DVD player using a custom application. In contrast, the game described herein provides for the randomly shuffling through a set of clips using only those capabilities available to a DVD player. Even though PCs have, of course, lots of memory, advanced CPU capabilities, etc., when a DVD-Video disc is read, PCs still utilize the DVD-Video software installed on a PC's hard drive, which still operates under the constraints of the DVD-Video specification (i.e., 16 General Parameter registers). So, even though a PC may be capable of doing more, in order to do so a PC needs a completely separate program, the DVD disc doing nothing more than acting as a storage medium for holding the clips. It would not then be DVD-Video (a subset of DVD-ROM, with a self-contained "operating system").

Any clip playback, shuffling, etc., would be actuated via a custom program of some sort that tracks the clips and does the shuffling.

Again, using a DVD-equipped PC should not make a difference in game play, as it still must utilize the DVD-Video specification via its installed DVD-Video Player software. A custom application is required to take advantage of the PC's other capabilities.

Those skilled in the art will also appreciate that the display device 104 may comprise a television, a computer screen, or other type of device capable of displaying video clips. Presumably, the display device also includes at least one speaker through which the DVD player 102 may play sound clips. Alternatively, the system includes speakers (not shown) connected either to the DVD player 102 or the display device 104. Additionally, those skilled in the art will also recognize that the DVD 106 may be replaced by other types of media that are readable by a DVD player 102. Examples include CD-ROMs, CD-Rs, CD-RWs, and DVD-Rs, all of which are readable by many DVD players, though many have substantially reduced storage capacity.

Figure 2:
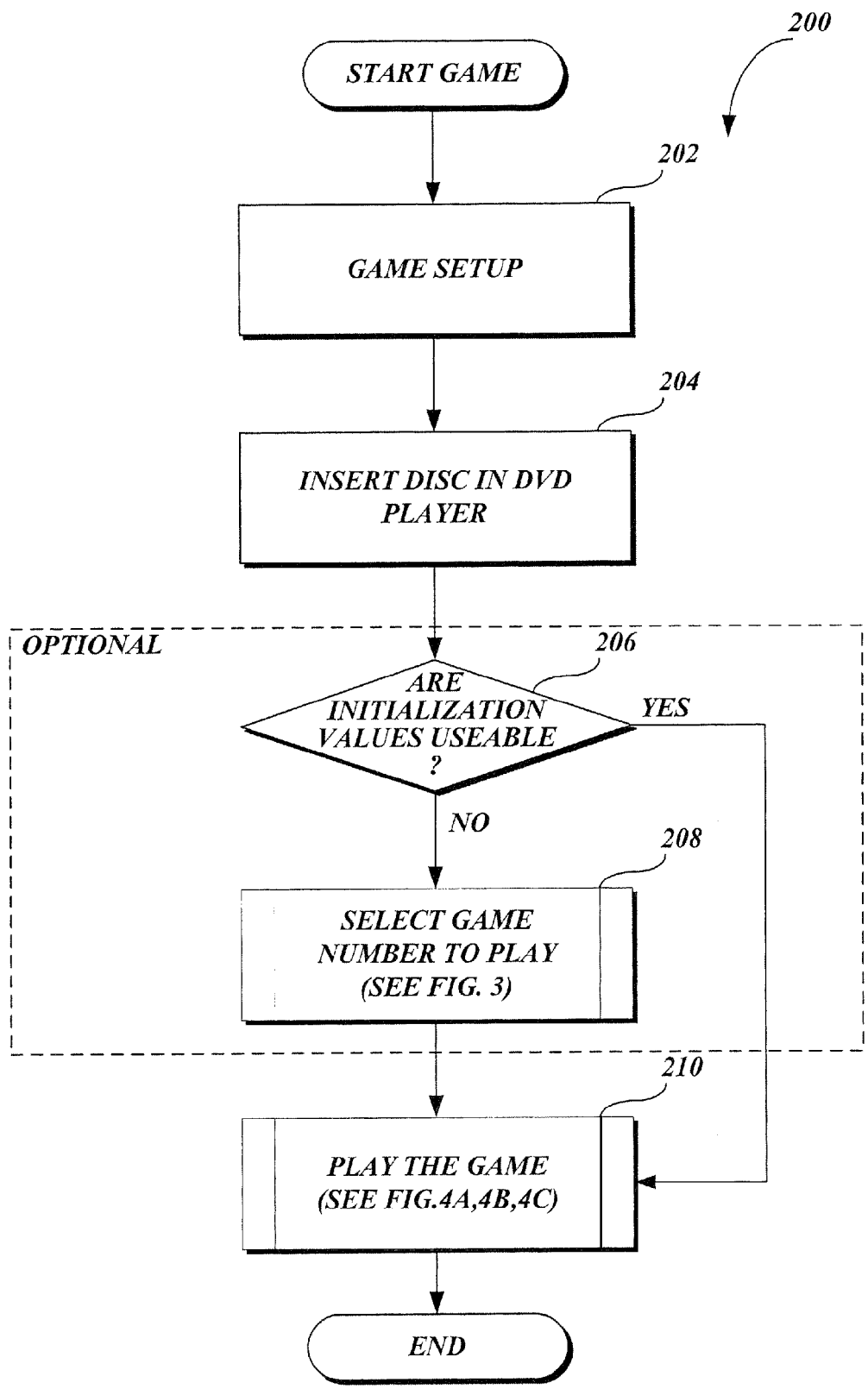
FIG. 2 is a flow diagram illustrating an exemplary routine for playing the DVD game system shown in FIG. 1.

FIG. 2 is a flow diagram illustrating an exemplary routine 200 for playing a DVD game using the exemplary game system 100 of FIG. 1. At block 202, the DVD game system 100 is set up. Inclusive in setting up the game, the game board 110 is placed in a position such that all the players can see the game board and the display device 104 connected to the DVD player 102. The game board 110 can be fully extended for long play, or folded for short play, as described below in regard to FIGS. 24-26. Additionally, each player chooses a game player piece 112 to represent his location on the game board 110 and places it on the begin region of the game board 110. An order of play is determined among the participants. Optionally, a player is selected as the DVD master to operate the DVD player controls. The controls may be found on the DVD player's remote control 108 or, alternatively, on some DVD players 102. The arrow controls, especially the Up and Down arrows (not shown) are used to navigate between displayed menu items. The center/enter/play button (not shown) activates a menu selection. The skip or fast forward buttons (not shown) may be used to navigate through clips.

At block 204, the DVD 106 is inserted into the DVD player 102. The DVD 106 contains instructions that cause DVD player 102 to initialize for game play. This initialization includes generating random values used in random shuffling of clips stored on the DVD 106. A further discussion of initializing the DVD player 102 for random shuffling is discussed below. Additionally, certain introductory information, such as the name of the game and copyright information, is displayed on the display device 104.

Blocks 206 and 208 are optional in this exemplary method, and are included to guard against those DVD players that have faulty random number generators, as previously discussed. At decision block 206, the DVD player 102, as an extension of the initialization described above, makes a determination whether the random values generated for random shuffling are useable. When faulty random numbers are generated, there exists a greater likelihood that clips from previous games are repeated. Thus, it is desirable to determine if the DVD player has a faulty random number generator. DVD players' random number generators are often faulty if they generate an excessive number of "1s." Consequently, if more than one of the random values needed to play the game is a "1," the DVD player 102 at decision block 206 determines that the values must be faulty and unusable. If the values are unusable, at block 208, the DVD player interacts with the players (or the DVD master) to select a game number, the game number corresponding to a set of previously generated values to simulate random values, and initialize the DVD player from those values.

Figure 3:
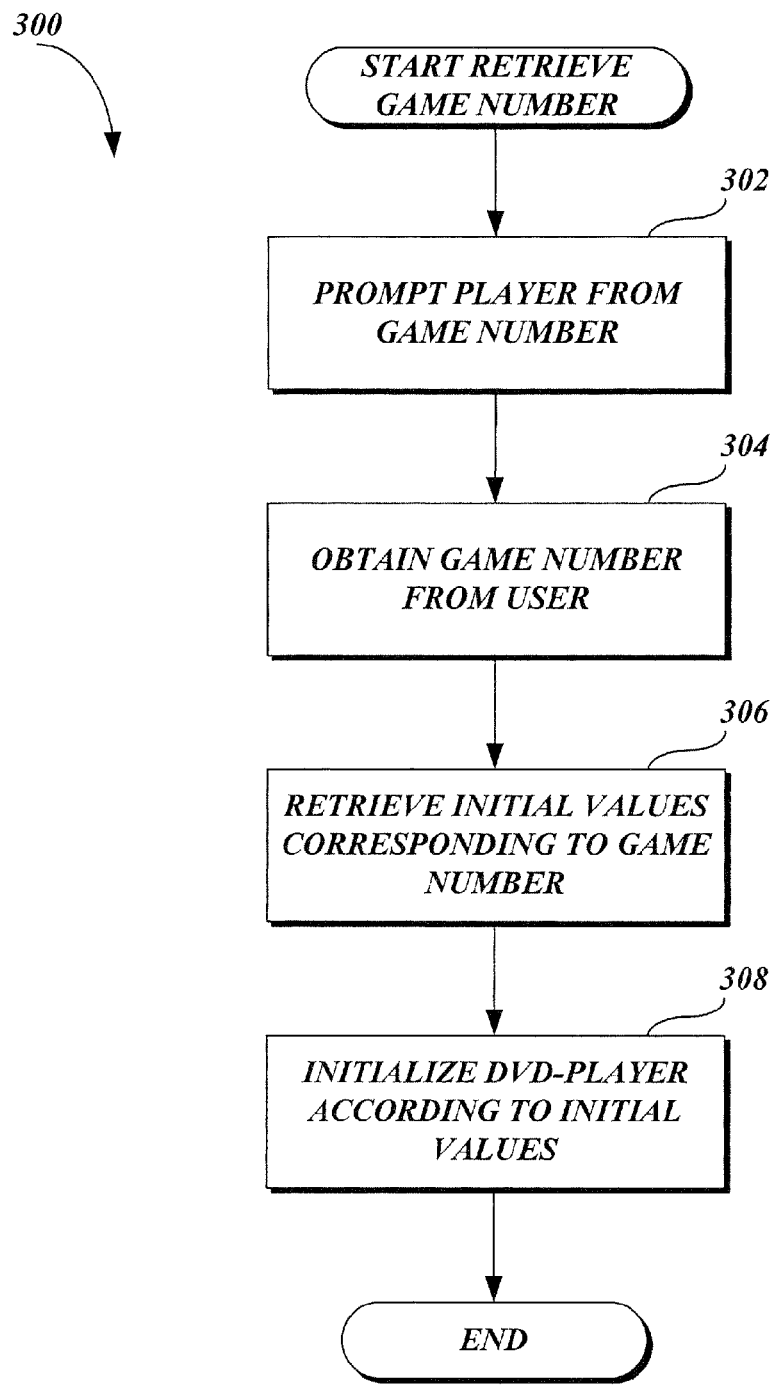
FIG. 3 is a flow diagram illustrating an exemplary game number selection routine for obtaining previously generated values for initializing a DVD player for random shuffling of video clips.

FIG. 3 is a flow diagram illustrating an exemplary game number selection routine 300 (block 208, FIG. 2) for obtaining previously generated values for initializing the DVD player 102 for random shuffling of clips. Beginning at block 302, the DVD player 102, through the display device 104, prompts a player to input a game number. At block 304, the player inputs a game number, using either the remote control 108 or the DVD player's controls, between one and the total number of games available. At block 306, the DVD player 102 retrieves the values corresponding to the game entry from the initial values table. At block 308, the DVD player 102 uses the retrieved values to initialize itself for random shuffling of clips, whereupon the method 300 terminates.

In an actual embodiment of the invention twenty (20) some games are available from which to choose. This number should be taken as illustrative, not limiting, since it was based on available programming time and expected needs of the game players. It also was based on the graphical design layout of the screen and the fact that more choices would be difficult to fit on a screen. Thus, many more or many fewer games could be chosen, but more would require more choice screens.

The number of "game" choices has nothing to do with "the size of an initial values table." As noted above, in one actual embodiment of the invention the number of game choices was purely determined upon on how many would fit on a screen nicely and available time for programming those choices. The actual programming, of course, still does correspond to the initial values table (i.e., if the player chooses "game three," the program initializes with the predetermined values that will provide a game play sequence that will have no or very few repeats from Game 1 and Game 2 until very deep into the game). Those game choices are typically made using the remote control arrow buttons, not the number commands on the remote control.

Figure 4A:
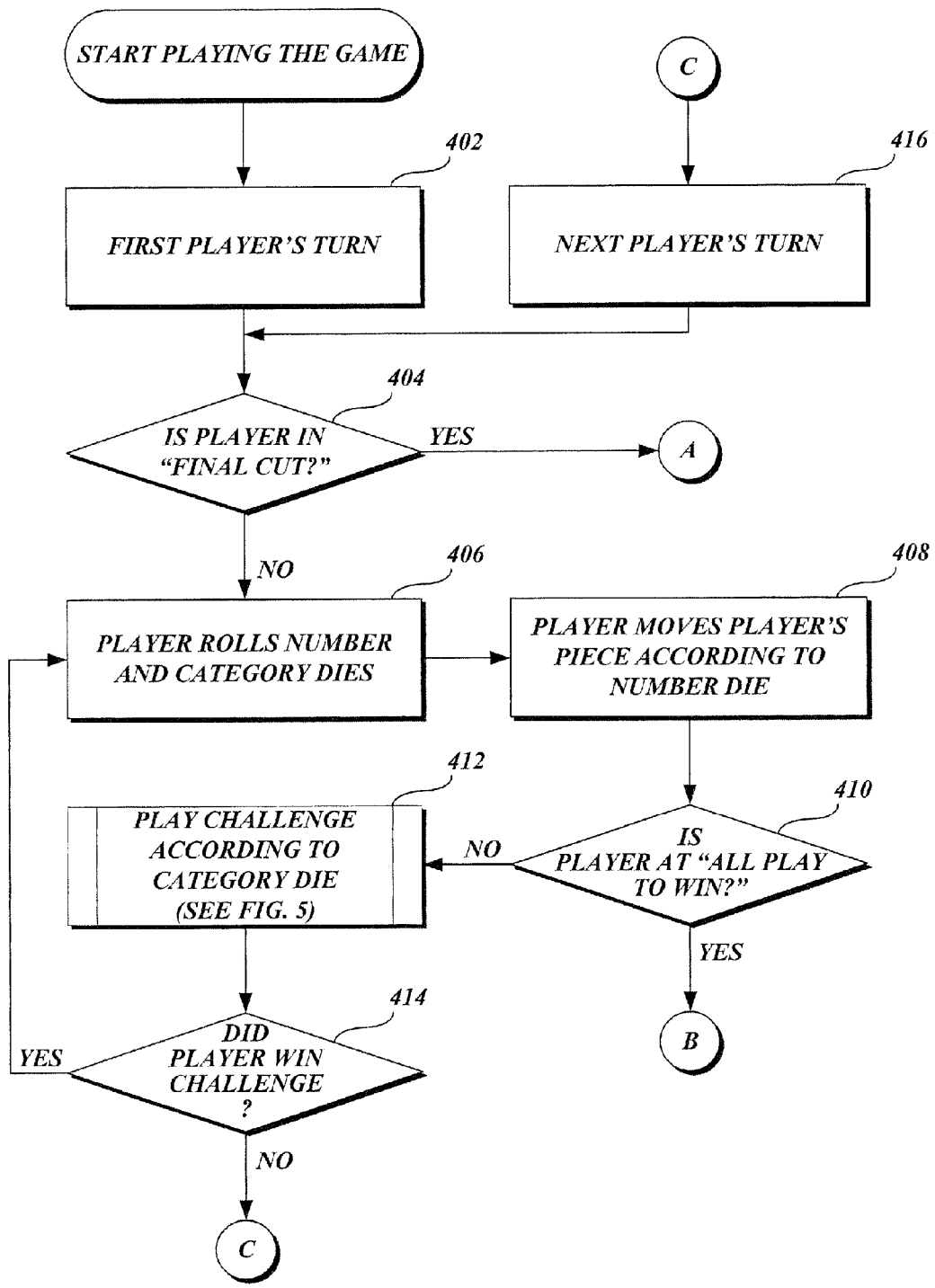
FIGS. 4A, 4B, and 4C are a flow diagram illustrating an exemplary method of playing the DVD game shown in FIG. 1.
Figure 4B:
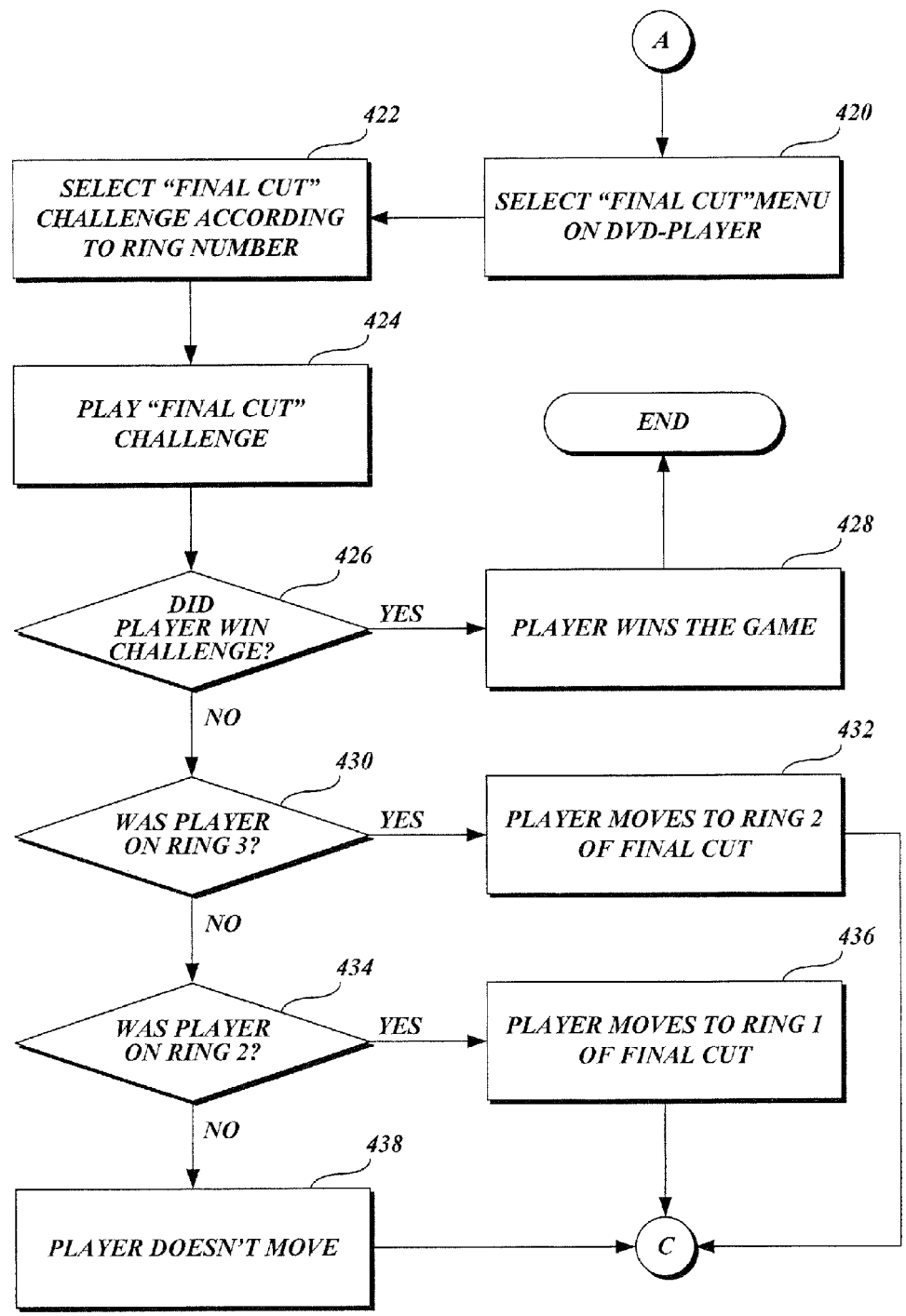
Figure 4C:
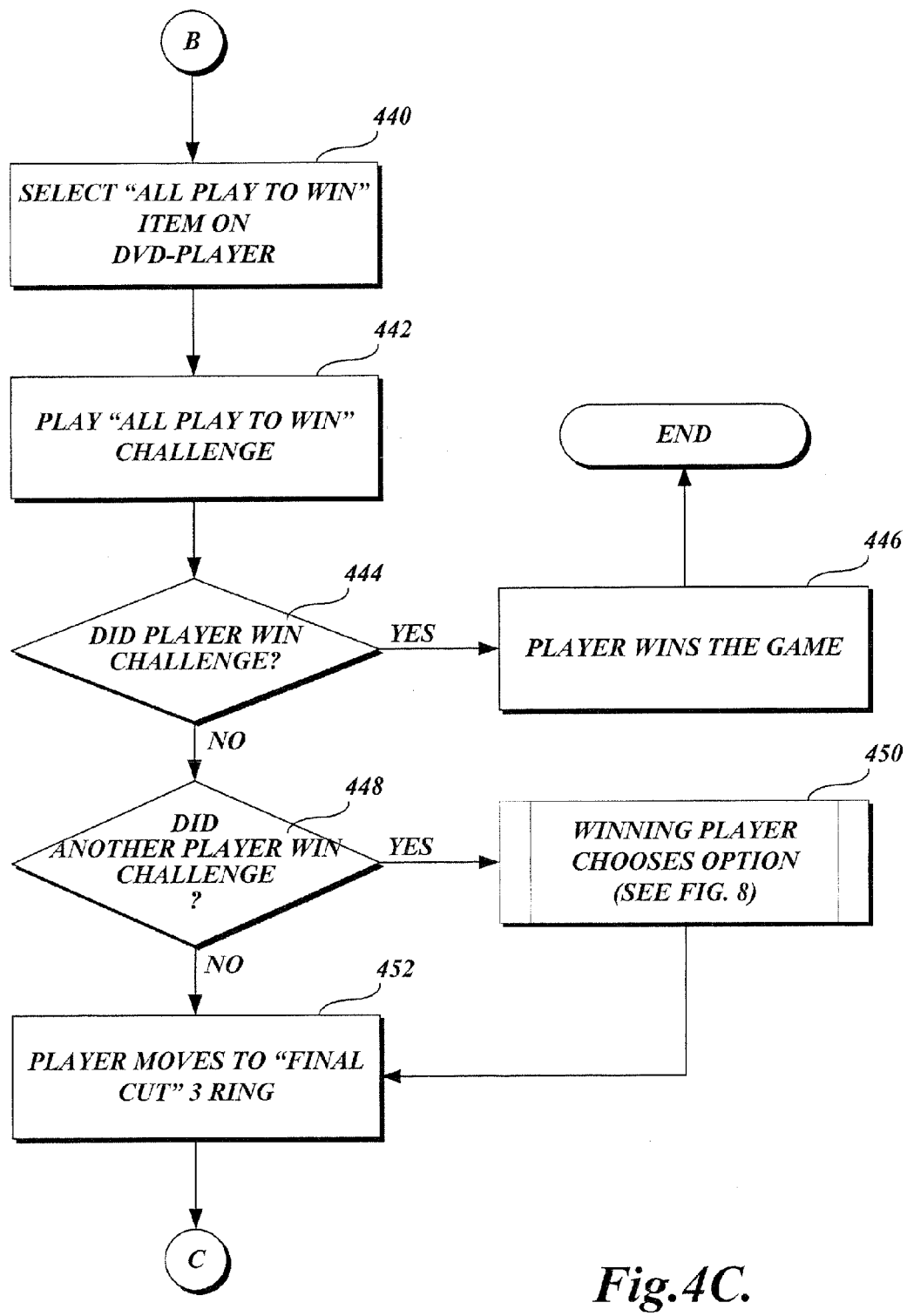

Returning back to FIG. 2, at block 210, after the DVD player 102 is initialized for play, the game play begins. FIGS. 4A, 4B, and 4C are a flow diagram illustrating an exemplary method for playing a game using the exemplary DVD game system 100 of FIG. 1. Beginning at block 402, the first player, according to the previously determined order of play, begins his turn. For purposes of clarity in regard to FIGS. 4A, 4B, and 4C, when the description refers only to "the player," it is intended to mean "the player whose turn it is."

With reference to FIG. 4A, at decision block 404, a determination is made whether the player is in a Final Cut region on the game board 110. The Final Cut region is a part of the game board 110 from whence the player may win the game, and is at the end of the path on the game board. Moving in, and winning the game from the Final Cut region is described more fully below. If the player is not in the Final Cut region, at block 406, the player rolls the number die 118 and the challenge die 120. Both die are multiple-sided die. In one actual embodiment of the invention, the number die 118 is a typical six-sided die, each side having a number between 1 and 6 and the challenge die 120 is an eight-sided die with a symbol on each facet indicating a particular challenge for the player. In this embodiment of the invention, there are seven different challenges, each represented on one facet of the eight-sided die, and one challenge is represented on a second facet of the die. The challenges are described in greater detail below in regard to FIGS. 5-9. Those skilled in the art will recognize that there are any number of random selection devices, both mechanical and electronic, that may be used in place of the dies 118 and 120, and the present invention should not be construed as limited to any particular random selection devices or any particular number of sides for embodiments of the same employing die. Additionally, while one aspect of the game described herein includes seven challenges, this is a matter of preference and is not intended to be construed as limiting upon the present invention. Any practical number of different challenges may be available, employing any number of selection mechanisms.

At block 408, the player moves the player's corresponding player piece 112 according to the number showing on the top facet of the numbered die 118. These movements correspond to intermediate locations along a path (described below) on the game board 110 between a begin region and an end region, wherein the first player to reach the end region is the game winner. If the player's movement will cross an All Play To Win location on the game board 110, the player must stop at that location, and cannot move beyond that location in the current turn, except when winning the game (described below). Accordingly, at block 410, a determination is made as to whether the player landed on, or was stopped at, an All Play To Win location. If the player's corresponding player piece is not on an All Play To Win location, at block 412, the player responds to a challenge according to the challenge displayed on the top facet of the challenge die 120.

Figure 5:
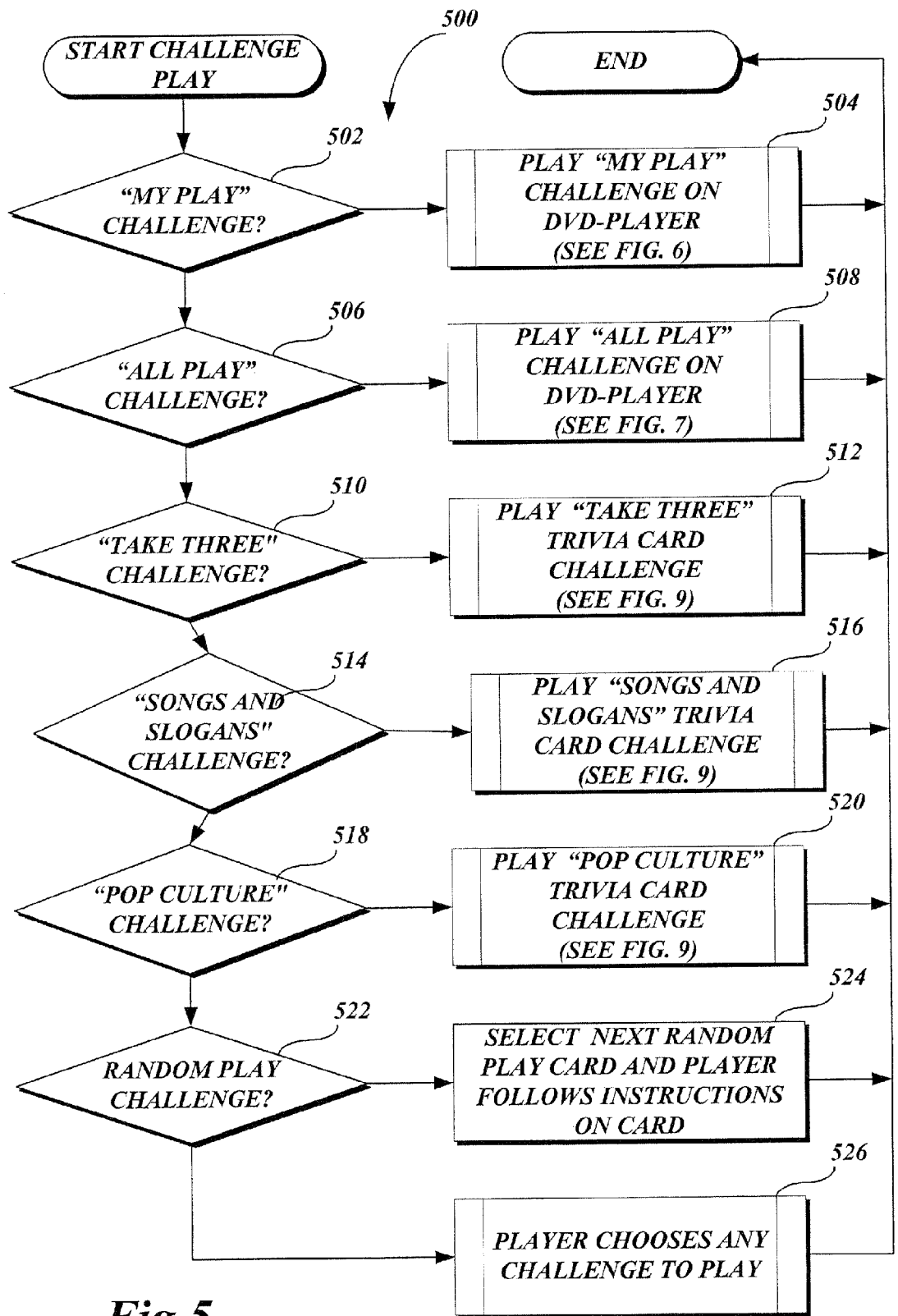
FIG. 5 is a flow diagram of an exemplary play challenge sub-routine for playing a challenge of the DVD game shown in FIGS. 4A, 4B and 4C.

FIG. 5 is a flow diagram of an exemplary play challenge sub-routine 500 for playing a challenge of the game described herein. While this exemplary sub-routine identifies seven challenges, employed in one actual game, the number and type of the described challenges are intended to be illustrative and should not be construed as limiting.

At decision block 502, a determination is made whether the selected challenge (that challenge displayed on the top facet of the challenge die 120) is a My Play challenge. If the selected challenge is a My Play challenge, at block 504, a My Play challenge is played.

Figure 6:
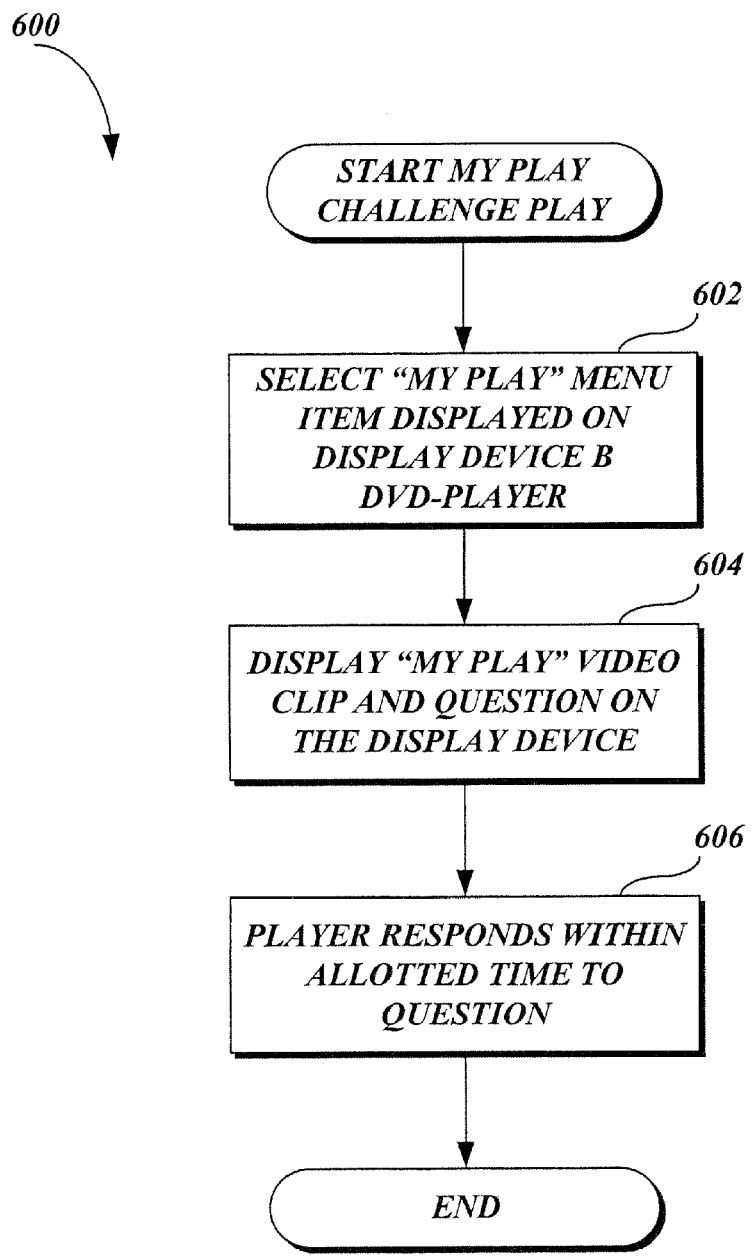
FIG. 6 is a flow diagram illustrating an exemplary My Play challenge sub-routine suitable for use in the play challenge sub-routine shown in FIG. 5.

FIG. 6 is a flow diagram illustrating an exemplary My Play challenge sub-routine 600. Beginning at block 602, the "My Play" entry displayed on the display device 104 by the DVD player 102 is selected using the DVD player controls. At block 604, the DVD player 102 plays a clip on the display device 104 from those clips available for the My Play challenge, selected according to the random shuffling technique illustrated in FIG. 15 and described below.

Also displayed (or uttered) subsequent to the clip or, alternatively, as part of the clip, is a question for the player. While this discussion and many of the following discussions refer to a question being asked in connection with a challenge, it is to be understood that questions/challenges may take forms other than questions. Thus, questions and challenges are intended to be illustrative and not construed as limiting. While "challenges" may present a question associated with the clip, other puzzles ("challenges") for which the player must respond correctly may also be displayed. The following are representative challenges:

a plurality of movie titles are displayed and the player is required to correctly enumerate them in chronological order of the movies' release;

hidden letters represented by blank spaces are revealed one by one until the player properly identifies the entire name, phrase, title, etc.;

a portion of dialogue or music is played and the player must identify the source, such as the title of the movie, speaker/singer, or event related to the dialog;

a group of images from a video clip is displayed and the player must identify the source (i.e., the title of the movie, event, etc.) of the images;

a group of images from a video clip is displayed and the player is required to phonetically guess the title of the video clip;

a plurality of characters an actor or actress has played are presented one by one and the player must guess the name of the actor or actress;

a series of short scenes from a video clip are presented in succession and the player must properly identify their source;

an image from the video clip with certain elements removed, such as the actors, and the player is to identify the source, such as title, event, etc., of the video clip;

a distorted image from a video clip is displayed, the distortion is gradually removed, and the player must identify the image before the distortion is completely removed;

an alternate title is provided for a video clip and the player must identify the proper title; and and various images of a person earlier in life, such as a teenager, are displayed and the player must identify the person from the images.

As will be readily appreciated from the foregoing representative list of challenges, the challenges are puzzles that are presented by a human-perceivable presentation device, such as an audio/video display device—a television set in the herein-described embodiment of the invention. The challenges or puzzles are stored on random access media, namely a digital video disk (DVD) in the preferred embodiment of the invention, as clips with associated questions. The clips may be video clips, audio clips, or a combination thereof. A clip may be played before or after the associated question. The clips and questions may cover any suitable area and come in a wide variety of forms. For example, the clip may be a video clip that includes a plurality of objects arrayed in random order or an audio clip that includes a plurality of objects spoken in a random order. The objects may be movie titles, for example. The question may request a user to list the objects in a specific order, such as chronological order.

Alternatively, the clip may be a video clip that comprises a series of hidden letters that define an object, the hidden letters revealed one at a time when the media (DVD) is played by a media player. The object may be selected from a wide variety of potential objects, such as names, titles, phrases, and events, and the question may be the identity of the object. Or the clip may be a video clip that includes a word sequence or an audio clip that speaks a word sequence. The word sequence may be a dialog sequence, such as a dialog sequence from a movie, for example. Or the word sequence may be a song sequence. The question may be the identity of the speaker of the sequence.

As a further alternative, the video clip may comprise a group of images taken, for example, from a movie. The question may be the title of the movie or the identity of the source of the images. The source could come from a wide variety of areas, such as names, titles, phrases, and events. Or the group of images may identify an object selected from such a group. Or, the group of images, when combined, may identify and object or thing, which is the answer to the question. The object or thing may be phonetically identified or identified by spelling. The names may include the names of individuals or the names of characters portrayed by individuals. Still further, the clip may be a video clip that comprises a series of images of individuals, who may be actors or actresses, and the question may be the identity of the individuals. Or the individuals may be characters played by the actors and actresses, and the question is the identity of the actors or actresses who played the characters.

Still further, the clip may be a video clip that comprises a series of short scenes presented in succession—movie scenes, for example. The scenes may be from the same or a different movie. The question may be the identity of the source of the short scenes or the identity of an actor or actress included in the short scenes. Still further, a clip may be a video clip that comprises a scene with certain elements removed. The scene may be from a movie, for example, with the removed element being an actor or actor's face. The question may be the identity of the scene, or the identity of the actor or actress.

As a further example, the clip may be a video clip with a distorted image. The image may be optically distorted, such as the one created by a "fun house mirror," for example. Or the distorted image may be distorted by the removal of slices, pixels, etc. The distorted image may be gradually improved as the video clip is played by adding slices or pixels, for example. Or the clarity of the image may be improved in some other way. The question may be the subject matter of the distorted image.

Still further, the clip may be an audio or video clip that includes a correct title, such as the title of a movie, and the question may be the proper title. Still further, the video clip may include one or more images of an individual as the individual appeared earlier in life, and the question may be the identity of the individual.

A further example is a video clip that creates a series of images that begin with a small part of a larger image and zoom toward the larger image. An example would be an image from a movie. The question may be the name of the movie. A further example is an audio or video clip that contains a list of credits, such as a list of credits from a movie, and the question may be the identity of the movie. Still further, the clip may be an audio or video clip that includes foreign language information, such as a movie poster in a foreign language, and the question may be the identity of the movie.

As a still further example, the clip may be an audio or video clip that contains a list of elements, one of which does not fit in the list based on some predetermined criteria, and the question may be the identity of the element that does not fit in the list based on the incorrect criteria. A still further example clip may be a video clip that contains an image that is incorrect in some respect, and the question may be why the image is incorrect.

At block 606, the player must respond to the question displayed on the display device 104 within the allotted time, i.e., the time allotted to answer the question. Failure to respond to the question within the allotted time is considered an incorrect response. During the allotted time, preferably a countdown clock is displayed on the display device 104. Whether the response is correct or incorrect is remembered for further processing. Thereafter, the sub-routine 600 terminates.

Those skilled in the art will appreciate that, as noted above, clips, as used in relation to the game described herein, may refer to many different things. For example, a clip may be one of the following: a video segment of a movie; a video segment of a sporting event; a video segment of a news event; an audio clip of a movie, sporting event, news item (with or without a video image) or song; a collage of images indicative of a movie, etc.; image and word puzzles; and the like. The content and context of the clips is not intended to be limited in any way other than playable (either visually or audibly, or both) by the DVD player 102.

Returning to FIG. 5, remembering again whether the player responded to the My Play challenge of block 504, the routine terminates. Alternatively, if, at decision block 502, the selected challenge is not a My Play challenge, at decision block 506, a determination is made whether the selected challenge is an All Play challenge. If the selected challenge is an All Play challenge, at block 508 an All Play challenge is played.

Figure 7:
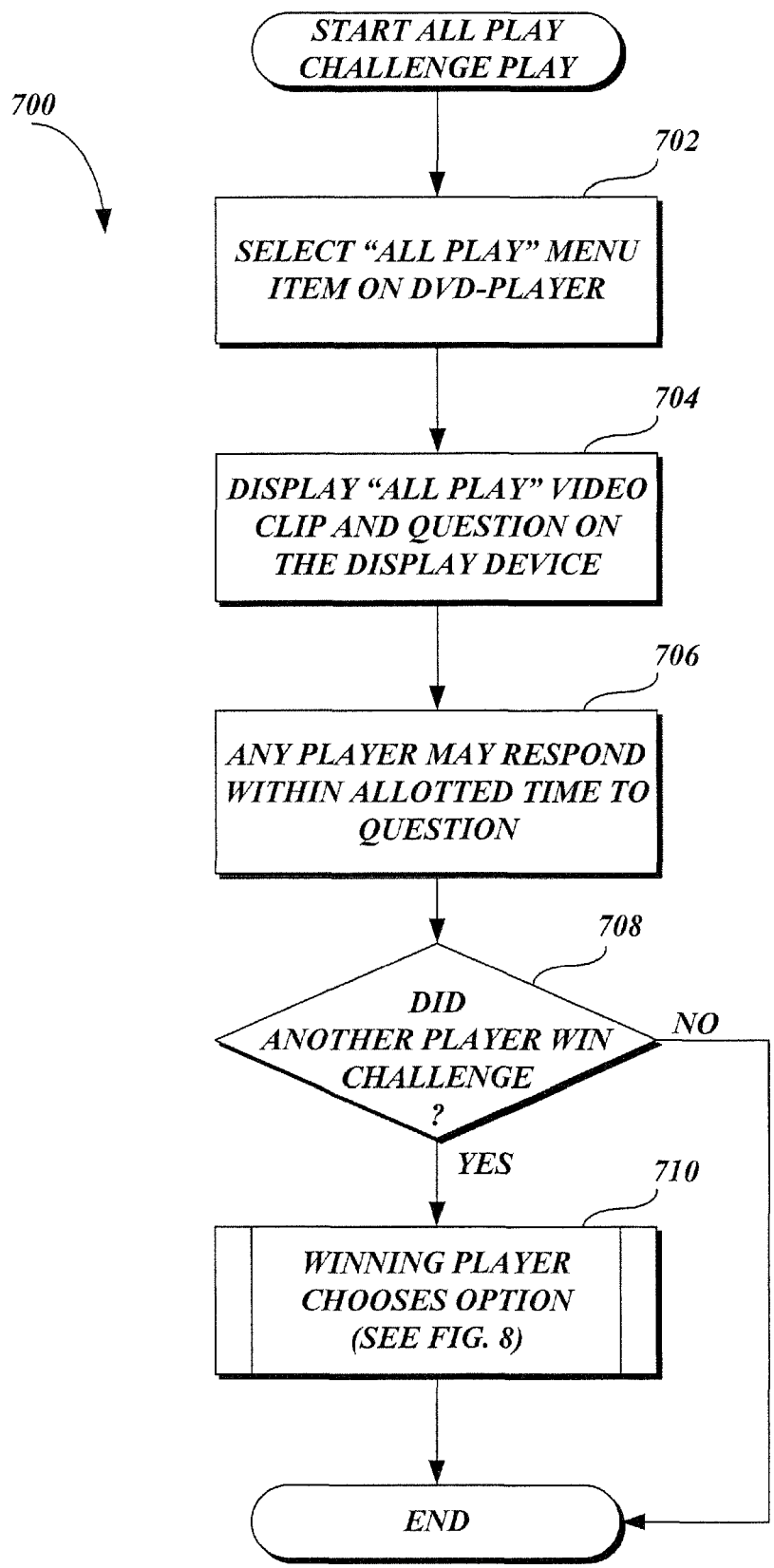
FIG. 7 is a flow diagram illustrating an exemplary All Play challenge sub-routine suitable for use in the play challenge sub-routine shown in FIG. 5.

FIG. 7 is a flow diagram illustrating an exemplary All Play challenge sub-routine 700. Beginning at block 702, the "All Play" entry DVD player created on the display device 104 by the DVD player 102 is selected using the DVD player controls. At block 704, the DVD player 102 displays a clip on the display device 104 from those clips designated for the All Play challenge, selected according to the random shuffling technique illustrated in FIG. 15 and described below. Also displayed is an associated question. Alternatively, another form of "challenge" may be present, as discussed above with respect to the My Play challenge. At block 706, any player may respond to the question or challenge displayed on the display device 104 within an allotted time. If the player whose turn it is fails to be the first to correctly respond, or fails to respond, it is considered an incorrect response for the player. Whether the player responded correctly is remembered for further processing. At decision block 707, a determination is made whether the current player correctly responded first to the challenge. If so, this information is remembered for subsequent processing and the All Play challenge ends. If the current player does not respond first to the challenge, at decision block 708, a determination is made whether another player correctly responded first to the challenge, thereby being the winning player of that challenge. If there is a winning player, excluding the player whose turn it is, i.e., the current player, at block 710, the winning player chooses a play option. An example of a play option is shown in FIG. 8 and described next.

Figure 8:
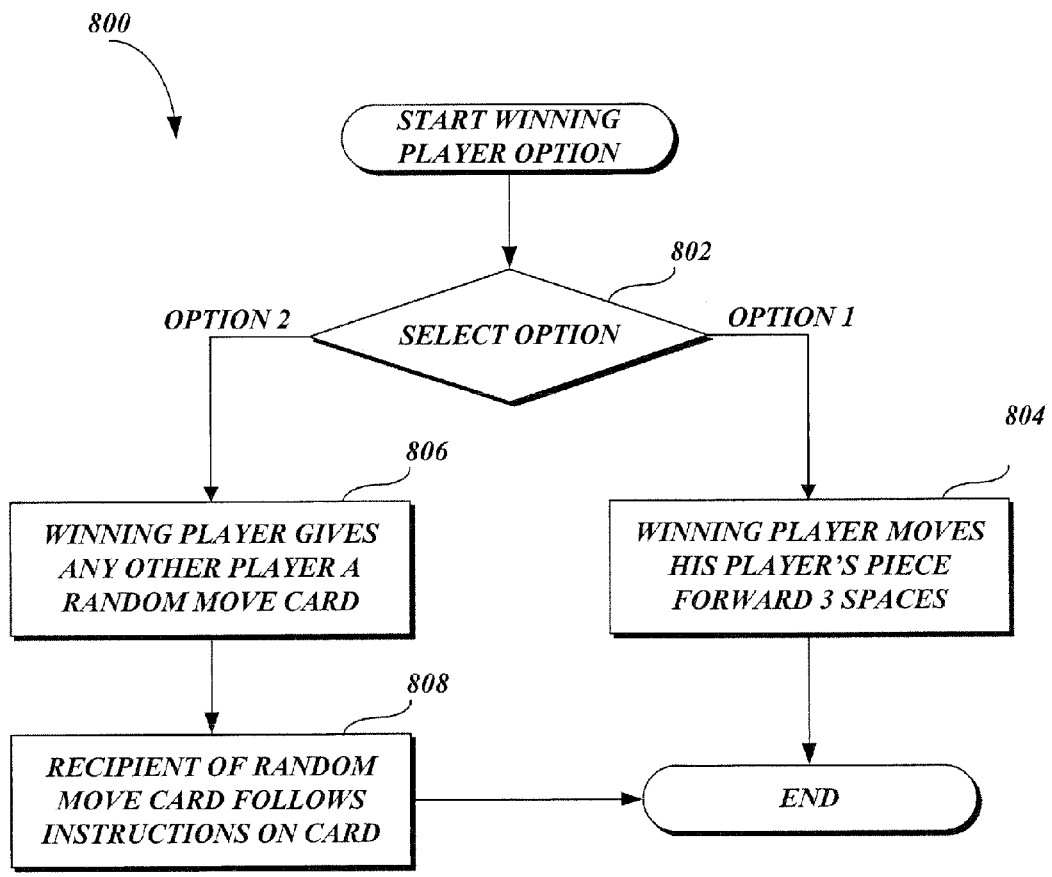
FIG. 8 is a flow diagram illustrating an exemplary sub-routine for permitting a winning player of an all play challenge to select a play option.

FIG. 8 is a flow diagram illustrating an exemplary sub-routine 800 for permitting a winning player of an All Play challenge to select a play option. Beginning at decision block 802, the winning player may choose between two options. Choosing Option 1, at block 804, the winning player moves his or her associated player piece forward on the game board a predetermined number of spaces, one, two or three spaces, for example. Alternatively, choosing Option 2, at block 806, the winning player gives any other player a random instruction card. At block 808, the recipient of the random instruction card follows the instructions on the random instruction card. Thereafter, the sub-routine 800 terminates.

Returning again to FIG. 7, after the winning player chooses an option, if there was a winning player, and remembering whether the current player's response was correct or incorrect, the sub-routine 700 terminates.

With reference again to FIG. 5, after block 508, remembering again whether the player responded to the All Play challenge correctly, the routine terminates. Alternatively, if, at decision block 506, the selected challenge is not an All Play challenge, at decision block 510, a determination is made whether the selected challenge is a Take Three challenge. If the selected challenge is a Take Three challenge, at block 512, a Take Three challenge is played.

Figure 9:
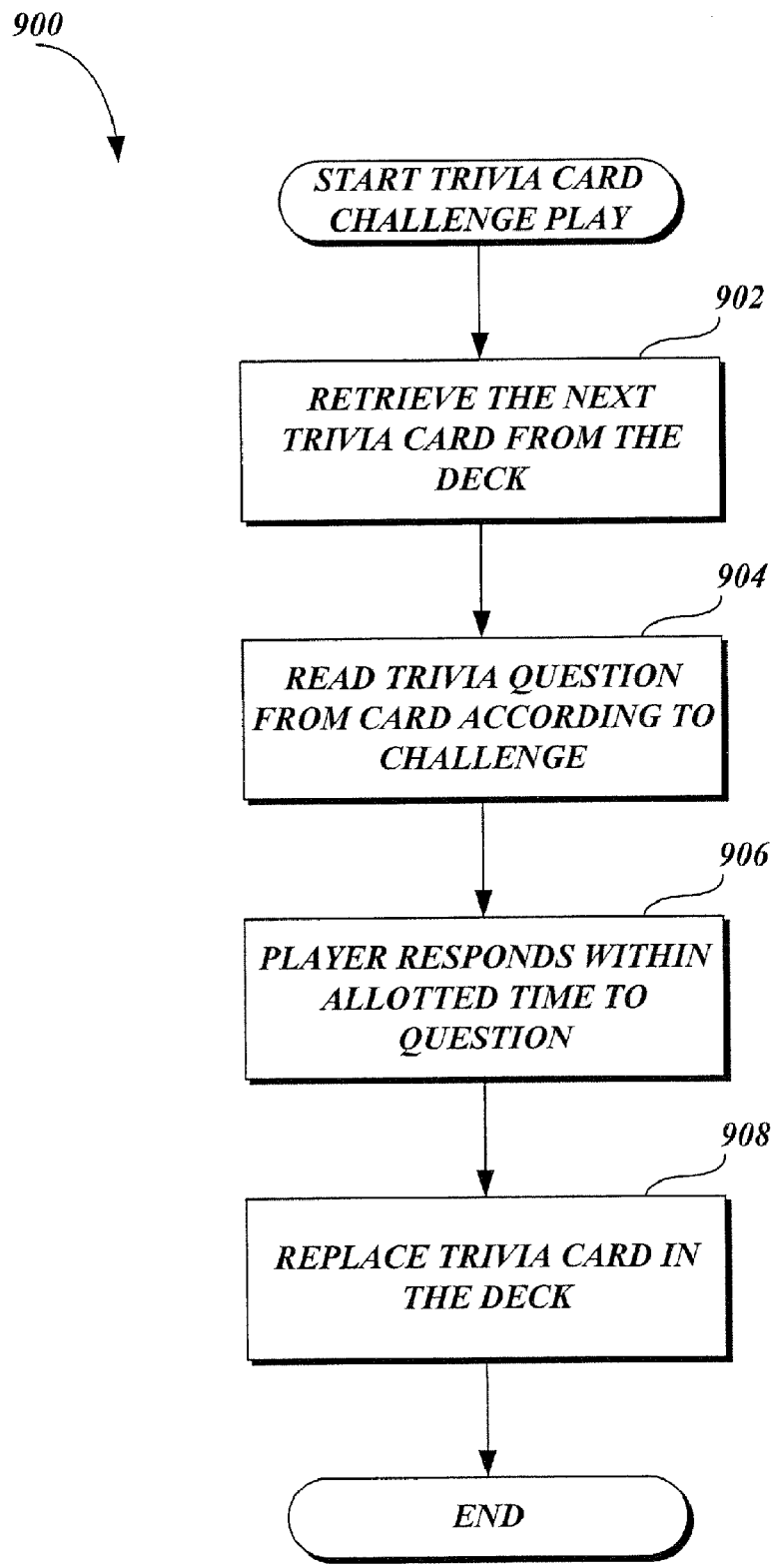
FIG. 9 is a flow diagram illustrating an exemplary trivia card challenge sub-routine suitable for playing the Take Three, the Songs and Slogans, or the Pop Culture challenge suitable for use in the play challenge sub-routine shown in FIG. 5.

FIG. 9 is a flow diagram illustrating an exemplary trivia card challenge sub-routine 900 suitable for playing the Take Three challenge, or the Songs and Slogans, or the Pop Culture challenges (described below). Beginning at block 902, a trivia question card is taken from the deck of trivia question cards 114. Preferably, the player whose turn it is does not draw the card. At block 904, the question corresponding to the selected challenge is read. For example, if the selected challenge is a Take Three challenge, a question on the trivia card identified for Take Three challenges is read to the player. Alternatively, if the selected challenge is a Songs and Slogans challenge, a question on the trivia card identified for Songs and Slogans challenges is read. The same is true for the Pop Culture challenge. At block 906, the player responds to the question. The player is constrained to respond to the question within an allotted time in order to respond correctly. Preferably, the DVD player 102 performs the timing function, which is displayed on the display device 104. If the player fails to respond within the allotted time, it is considered to be an incorrect response. At block 908, the trivia question card is replaced in the deck of trivia question cards 114 such that all other cards are drawn before this card is reused in this game. Whether the player's response was correct is remembered for later processing, and the sub-routine 900 terminates.

Returning to FIG. 5, remembering again whether the player responded to the Take Three challenge of block 512 correctly, the routine terminates. Alternatively, if, at decision block 510, the selected challenge is not a Take Three challenge, at decision block 514, a determination is made whether the selected challenge is a Songs and Slogans challenge. If the selected challenge is a Songs and Slogans challenge, at block 516, a Songs and Slogans challenge is played, as previously described in regard to FIG. 9. Remembering whether the player responded correctly to the challenge, the routine 500 terminates.

If, at decision block 514, the selected challenge is not a Songs and Slogans challenge, at decision block 518, a determination is made whether the selected challenge is a Pop Culture challenge. If the selected challenge is a Pop Culture challenge, at block 520, a Pop Culture challenge is played, as previously described in regard to FIG. 9. Thereafter, remembering whether the player responded correctly to the challenge, the routine 500 terminates.

If, at decision block 518, the selected challenge is not a Pop Culture challenge, at decision block 522, a determination is made whether the selected challenge is a Random Instruction challenge. If the selected challenge is a Random Instruction challenge, at block 524, the player draws a random instruction card from the deck of random instruction cards 116, follows the instructions on the card, and replaces the card in the deck, such that that particular random instruction card is not reused until all other random instruction cards have been used. Additionally, because there is no correct response to a question or other challenge, for purposes of further processing, the player is considered to have responded incorrectly to the challenge, and thereafter the routine 500 terminates.

If, at decision block 522, the selected challenge is not a Random Instruction challenge, it must be a Player's Choice challenge. At block 526, the current player may choose and play any one of the challenges described above, except another Player's Choice. Thereafter, remembering whether the current player responded corrected to the challenge, the routine 500 terminates.

With reference again to FIG. 4A, at decision block 414, a determination is made whether the current player responded correctly to the selected challenge. If the current player responded correctly, at block 406, the current player continues his or her turn. According to one aspect of the present invention, the current player's turn is continued until the current player responds incorrectly to a selected challenge. Alternatively, the current player's turn may be limited to one additional play.

If, at decision block 414, the current player's turn has exhausted its additional play, or the current player responded incorrectly to the challenge, at block 416, the turn passes to the next current player in the predetermined order of play. This next player becomes the player whose turn it is, i.e., the current player, and the process beginning with decision block 404 is repeated. As described above, this rotation of turns continues until a player wins the game.

With reference to FIG. 4B, if, at decision block 404 (FIG. 4A), the current player is in a Final Cut region, at block 420, the Final Cut menu item, displayed on the display device 104 by the DVD player 102, is selected using the DVD player controls. At block 422, according to instructions displayed on the display device 104, a ring number is selected according to the ring number on which the player's player piece resides. (See FIGS. 24-26 and the following description thereof.) For example, if the player piece currently resides on Final Cut ring 3, Option 3 is selected (using the remote control 108 or controls on the DVD player as described above). In one actual embodiment of the game described herein, each ring number corresponds to the number of questions/challenges to which the player must correctly respond during that turn in order to win the game. Thus, if the player is on Final Cut ring 3, the player must respond correctly to three Final Cut challenges issued in succession to win the game in the current turn. Accordingly, at block 424, at least one Final Cut challenge is displayed to the player by the DVD player. Like other challenges, the player must respond correctly to each Final Cut challenge within the allotted time, as kept by the DVD player and displayed on the display device 104, in order to have responded correctly to the entire Final Cut challenges. In one actual embodiment of the game described herein, no additional Final Cut challenges are displayed during the turn after an incorrect response.

At decision block 426, a determination is made whether the player correctly responded to each of the displayed challenges. If the player responded correctly to each of the displayed challenges, at block 428, the player is deemed to have won the game. However, if, at decision block 426, the player has not responded to each of the displayed challenges, at block 430, a determination is made as to whether the player's player piece is currently located in Final Cut ring 3. If the player's player piece is located in Final Cut ring 3, at block 432, the player's player piece is advanced to Final Cut ring 2. If not, at decision block 434, a determination is made as to whether the player's player piece is currently located in Final Cut ring 2. If so, at block 436, the player's player piece is advanced to Final Cut ring 1. If not, at block 438, the player's player piece remains in Final Cut ring 1. Thereafter, unless the player has won the game, at block 416 (FIG. 4A) the turn passes to the next player in the predetermined order.

With reference to FIG. 4C, at decision block 410 (FIG. 4A), if the player advances to, or stops at, an All Play To Win location on the game board 110, at block 440, the menu entry All Play To Win is selected using the DVD player controls. At block 442, an All Play To Win clip is displayed, selected according to the random shuffling of All Play To Win clips illustrated in FIG. 15 and described below, along with an associated question. As previously described above in regard to the All Play challenge, any player may respond to the challenge. At block 444, a determination is made whether the current player responded first and correctly to the challenge. If the current player is first to correctly respond to the challenge/question, and does so within the allotted time, at block 446, the current player is deemed to have won the game. Alternatively, at decision block 448, a determination is made whether another player was the first to correctly respond to the challenge within the allotted time, thereby winning the challenge. If another player won the challenge, at block 450, the winning player chooses a play option. This play option is previously described in regard to FIG. 8. In this case the predetermined number of spaces moved (block 804) may be different if Option 1 is chosen. For example, in the case of block 710 the predetermined number of spaces may be one and in the case of block 450, the predetermined number of spaces may be three.

The situation may arise where two or more players apparently tie in attempting to respond to an All Play challenge. When a tie arises (not shown), the Tie-Breaker entry is selected and the instructions that are given are followed to determine the winner among those who tied. Examples of these instructions include: determining the ages of the tied players and declaring the oldest the winner; playing a game of rock/paper/scissors; and thumb wrestling.

After the winning player chooses the play option or, alternatively, if no player won the challenge, at block 452, the current player moves his or her associated player piece to the Final Cut Ring 3 region. Thereafter, at block 416 (FIG. 4A), the turn passes to the next player in the previously determined order. Game play continues, as has been described in regard to FIGS. 4A, 4B, and 4C until a player wins the game.

As previously mentioned, a game formed in accordance with the present invention employs random shuffling of clips in a clip table in a manner that ensures that no clip is repeated during play of a game until all clips in the clip table have been played. However, in repeatedly playing games using the same DVD 106, clips of previous games will eventually be repeated. When this situation arises, if the players prefer to skip the repeated clip, a mechanism to quickly skip to the next clip according to the random shuffling techniques described below, using a single button press on the remote control 108 is provided. In this regard, DVD players typically are programmed to return to a title menu when the Return or Go Up button is pressed on the remote control 108. However, preferably DVD players 102 implementing the game described herein are configured such that when pressing the Return or Go Up button on the remote control 108, instead of returning to the main or title menu, the DVD player immediately executes selection of a next clip in some category. This functionality is preferably added to the programming of the DVD at each individual puzzle/challenge. This command is added to each PGC, linking the Return button back to the "All Play Enter" PGC, which contains the Modulo and all the Go To commands, telling the player where to go (i.e., if All Play Go To=148, go to PGC #148). By configuring the DVD player 102 in this manner, a player can immediately skip a current clip for the next clip according to the random shuffling techniques described below.

Figure 10:
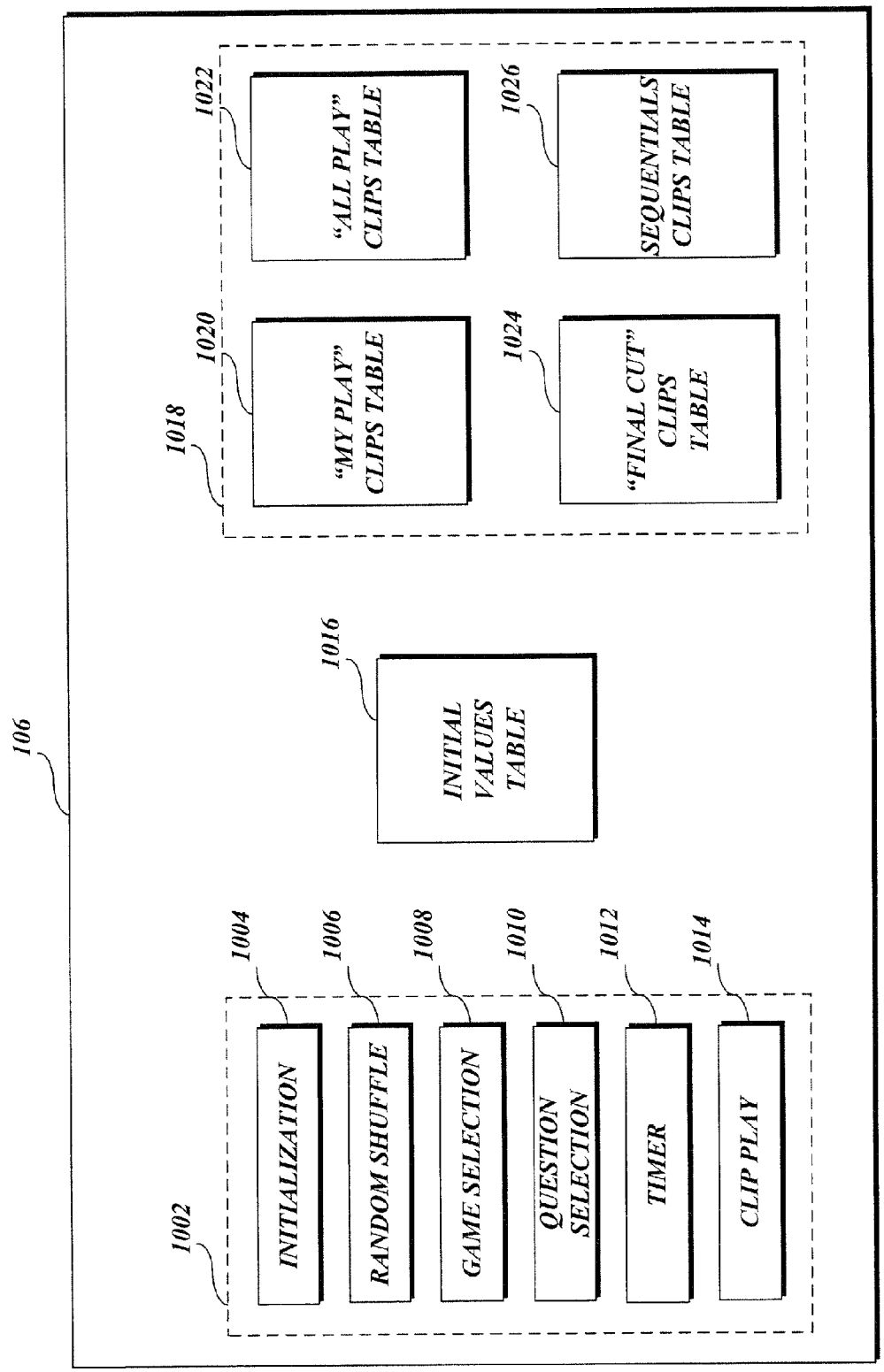
FIG. 10 is a block diagram illustrating an exemplary configuration of a DVD disc according to with the present invention.

FIG. 10 is a block diagram illustrating an exemplary configuration of a DVD disc 106 suitable for use in the game described herein. The DVD disc 106 comprises a plurality of DVD player instruction modules 1002 including: an initialization module 1004 for preparing the DVD player 102 for playing the DVD game, including initializations for random shuffling of clips, described in greater detail below in regard to FIG. 15; a random shuffle module 1006 for randomly iterating through a fixed set of clips without repeats and without tracking those clips already played; a game selection module 1008 for interacting with a player to select a set of predetermined initialization values when the initialization code determines that random numbers generated by the DVD player 102 are unusable; a question selection module 1010 for selecting and displaying one of a plurality of questions associated with a single clip, more fully described in regard to FIG. 14; a timer module 1012 for keeping track of, and displaying as a count-down clock on the display device 104, an allotted amount of time a player has to respond to a challenge; and a clip play module 1014 for retrieving and displaying a clip and associated question in accordance with a current clip value. It should be noted that these exemplary modules are discrete in a logical sense for illustration purposes, and their functionality may be combined with different modules or aspects in an actual DVD. Additionally, those skilled in the art will recognize that other modules, not mentioned in this description, may be present and necessary in order to operate the DVD game described herein.

The exemplary DVD disc 106 also comprises an initial values table 1016. The initial values table 1016 includes a plurality of predetermined values for initializing the DVD player 102 to perform the random shuffling of video clips when the DVD player determines that the random values generated by the random number generator are unusable. The initial values table 1016 is used in conjunction with the game selection module 1008. A more detailed description of initializing the DVD player using the initial value tables is provided below in regard to FIG. 16.

The DVD-disc 106 also includes at least one clip table. The illustrated exemplary DVD disc 106 comprises a plurality of clip tables 1018. This exemplary configuration includes four clip tables: My Play 1020; All Play 1022; Final Cut 1024; and Sequentials 1026. Each clip table corresponds to a particular challenge to be played during the DVD game.

Figure 11A:
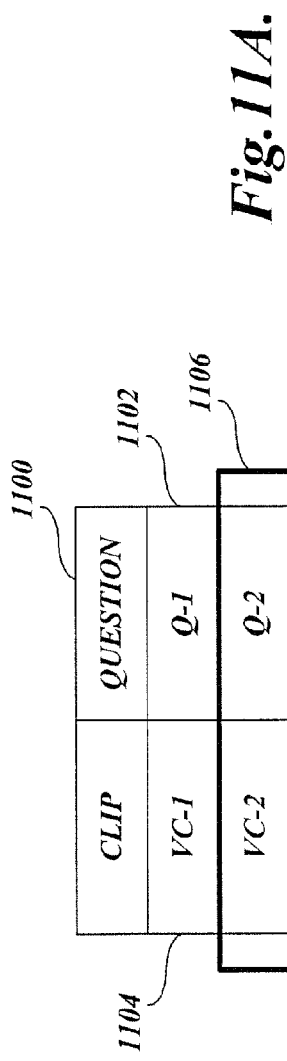

FIG. 11A is a block diagram illustrating an exemplary clip table 1100 stored on a DVD disc 106. For ease of illustration, the table is depicted in a row/column arrangement wherein an element in the first column of each row contains or identifies a clip, and an element in the second column identifies a question associated with the clip. Each row in the illustrated table 1100 constitutes a single entry, such as entry 1106, comprising a clip and question, within the table. Those skilled in the art will readily recognize that the headings shown on the top of the table are present for illustration purposes, and are not an entry in an actual clips table 1100.

Each clip element, such as element 1102, represents a clip to be played by the DVD player 102. This entry may contain the clip itself or, alternatively, may contain information for locating the clip elsewhere on the DVD disc 106. As a further alternative, this information in this element 1106 may identify a particular segment of a larger clip, such as one created as a collection of small individual clips. Those skilled in the art will recognize that there may be a variety of ways of storing or referencing the clips in conjunction with the clip table 1100, any of which can be employed.

Each question element, such as element 1104, represents a question/challenge to be played after the associated clip. Just as with the clips, this element 1104 may store the question itself, or contain information used to locate the question.

While the illustrated clips table 1100 shows that the clip and question elements are distinct, this distinction is for illustrative purposes and not intended to be construed as limiting on the present invention. In an alternative embodiment, the clip and the question are stored together, such that the clip and question are played in a continuous manner.

The number of entries in a clip table is important only insofar as the total number of entries must be a prime number. For example, the number of entries in clip table 1100 may be 37, though a table with just 37 entries would not likely be sufficient to provide enough selection for a game. In one embodiment of a game of the type described herein, there are 239 entries in a clip table. Additionally, when the number of clip entries available to a developer is not prime, rather than truncating the number of entries to a prime number, the developer may pad the number of entries in the clip with dummy clips (or dummy PGCs) up to the next prime number. Skip-clips, as used in conjunction with the present invention, are entries in the clip tables that cause the DVD player to immediately re-select another clip. When used in conjunction with the random shuffling techniques described below in regard to FIG. 15, a given skip-clip entry will be accessed only once while shuffling the entire set of clips in a clip table.

Figure 12:
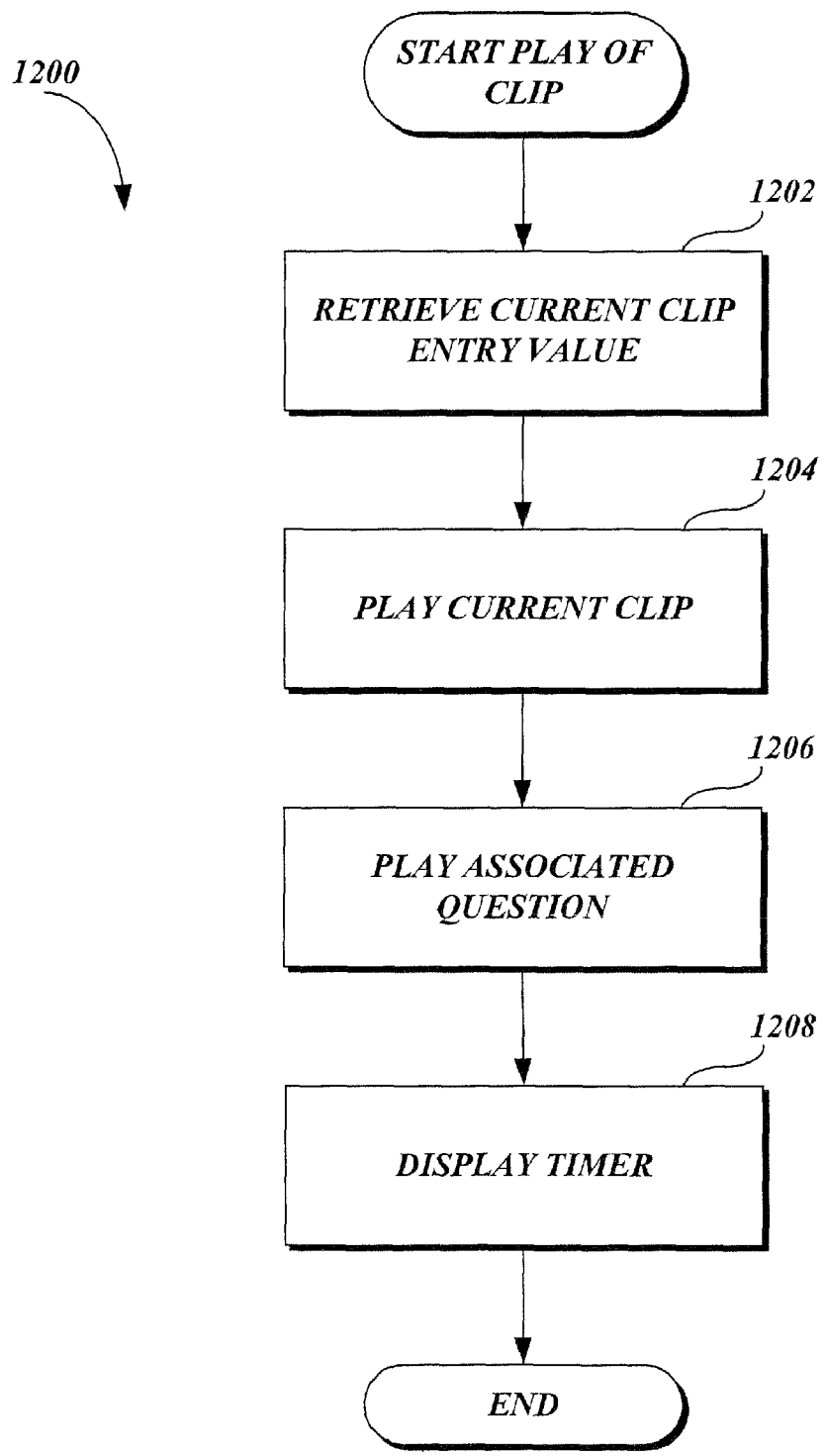
FIG. 12 is a flow diagram illustrating an exemplary clip play routine suitable for playing a video clip and associated challenge from a clip table of the type shown in FIG. 11A.

FIG. 12 is a flow diagram illustrating an exemplary routine 1200 suitable for playing a clip and associated challenge from a clip table such as described in regard to FIG. 11A. At block 1202, an entry in the clip table 1100 (FIG. 11A), such as entry 1104, is accessed. This entry in the clip table 1100 is selected according to a current clip value generated in accordance with the random shuffling of clips described below in regard to FIG. 15. At block 1204, the clip is played by the DVD player 102 on the display device 104. At block 1206, the associated question is played by the DVD player 102 on the display device 104. At block 1208, a timer is displayed by the DVD player 102 on the display device 104 indicating the allotted time in which the question is to be answered. Thereafter, the routine 1200 terminates.

Figure 11B:
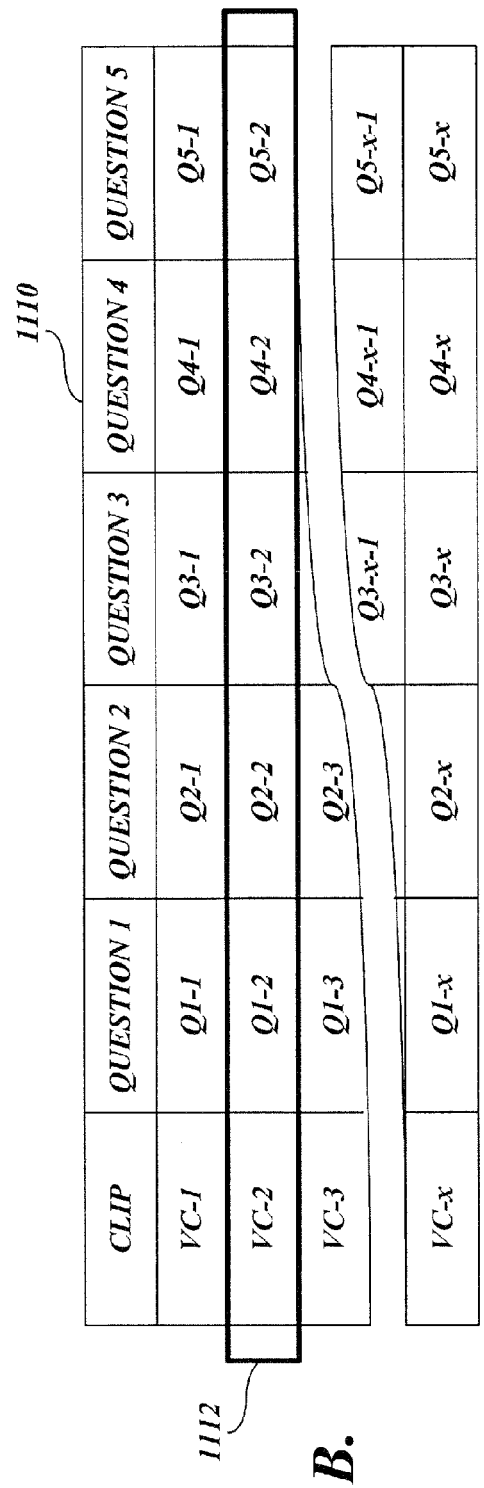

FIG. 11B is a block diagram illustrating another exemplary clip table 1110 stored on a DVD disc 106. In contrast to the clip table 1100 of FIG. 11A, clip table 1110 has five questions associated with each clip element, such as clip element 1112. While this exemplary clip table 1110 shows that there are five questions associated with a single clip, this number of associated questions is intended to be illustrative, and not construed as limiting. Those skilled in the art will recognize that any practical number of questions may be associated with a clip.

Figure 13:
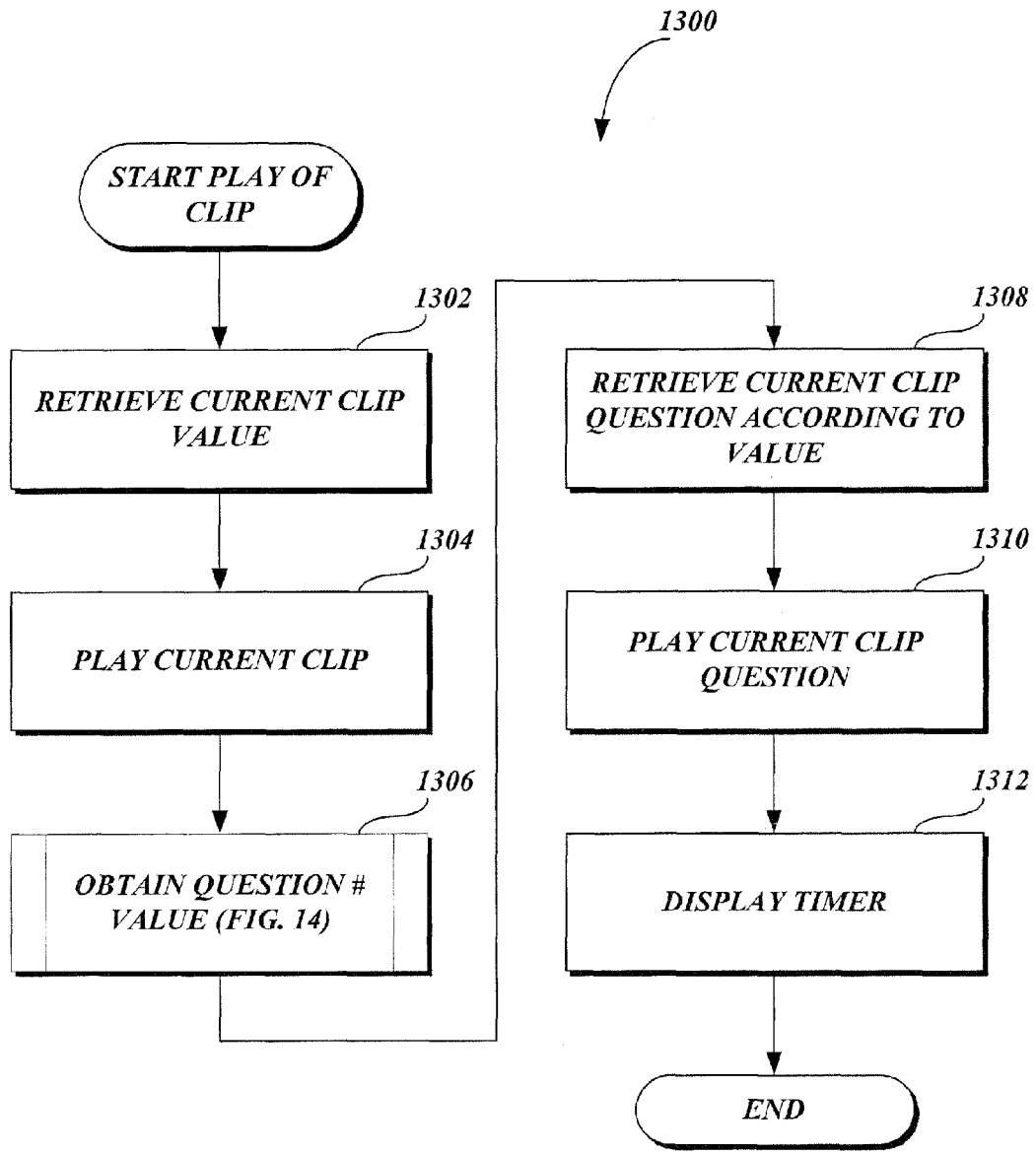
FIG. 13 is a flow diagram illustrating an exemplary routine suitable for playing a clip and associated challenge from a clip table of the type shown in FIG. 11B.

FIG. 13 is a flow diagram illustrating an exemplary routine 1300 suitable for playing a clip and associated challenge from a clip table such as described in regard to FIG. 11B. At block 1302, an entry in the clip table 1110 (FIG. 11B), such as entry 1112, is accessed. This entry in the clip table 1110 is selected according to a current clip value generated in accordance with the random shuffling of clips described below. At block 1304, the clip is played by the DVD player 102 on the display device 104. At block 1306, a sub-routine is called to randomly select one of the questions associated with the clip for playing.

Figure 14:
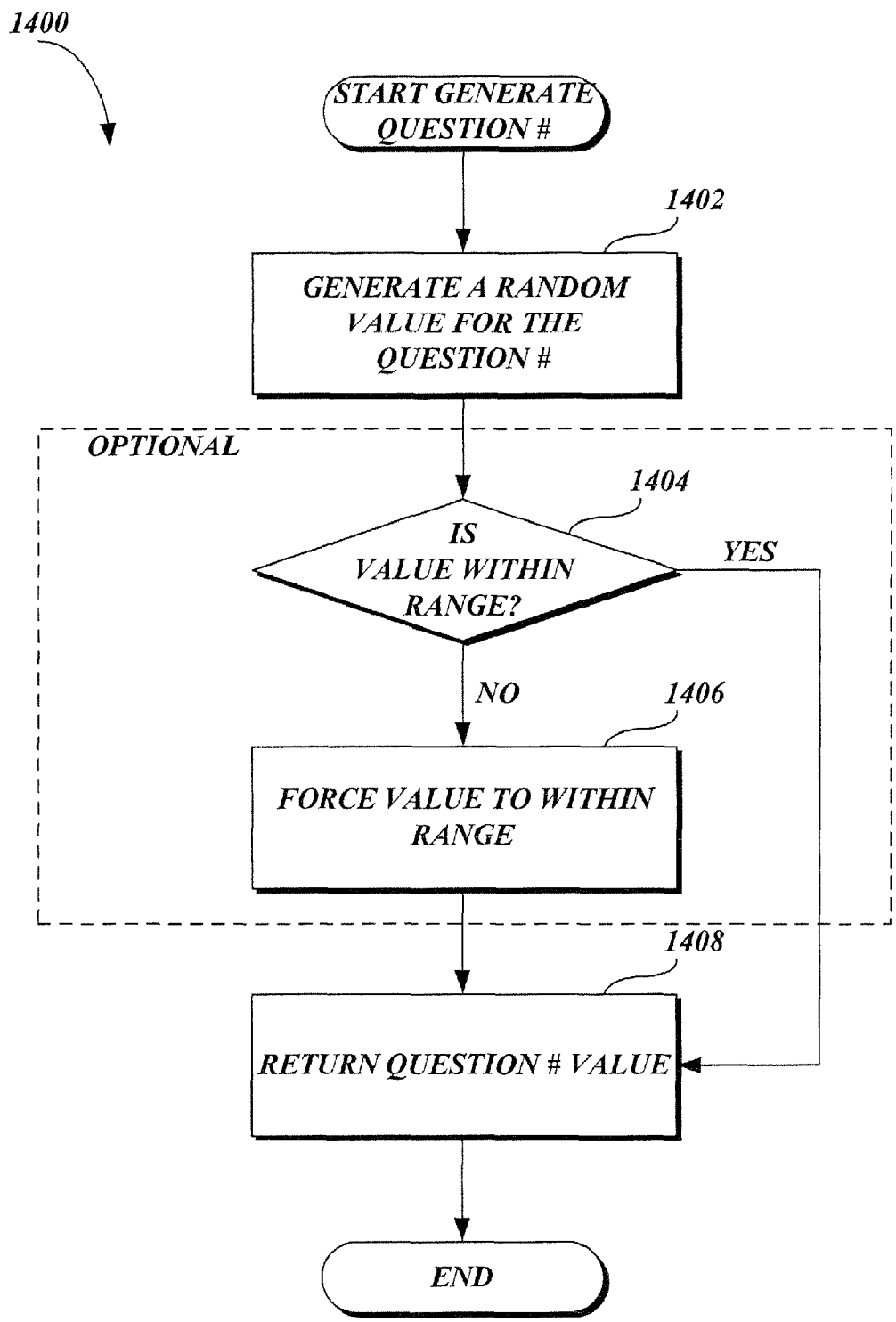
FIG. 14 is a flow diagram illustrating an exemplary sub-routine suitable for randomly selecting a question associated with a displayed clip.

FIG. 14 is a flow diagram illustrating an exemplary sub-routine 1400 suitable for randomly selecting a question associated with the played clip. At block 1402, the DVD player 102 generates a random number between one and the total number of questions associated with the played video clip. For example, in the illustrative clip table 1110 (FIG. 11B), the total number of questions associated with a clip is five. At decision block 1404, an optional determination is made whether the random number generated is within the range described above. This determination may be excluded from the illustrative routine 1400 if one is willing to rely upon the DVD player 102 to reliably generate random values according to the specifications. However, certain experimentation has shown that not all DVD players strictly conform to the specification. At block 1406, if it is determined that the value does not conform to the specified range, a value within the range is used. Using the example above, if the value is not between one and five, the value five is selected. Other methods of ensuring that the number falls within the specified range may also be used. At block 1408, the associated question number is returned and the routine 1400 terminates.

With reference again to FIG. 13, at block 1308, the associated question is retrieved according to the returned question number. At block 1310, the associated question is played by the DVD player 102 on the display device 104. At block 1312, a timer is played by the DVD player 102 on the display device 104 indicating the allotted time in which the question is to be answered. Thereafter, the routine 1300 terminates.

As previously mentioned, the present invention provides a method for randomly shuffling through a table, or set, of clips for processing, without the need to track those clips already processed. In order to randomly shuffle through the clips, certain values must be initialized. In particular, a random shuffle routine requires two values, a current clip value and a jump value. Using these two values, properly initialized, clips from a set of clips may be randomly selected without repeating the selection of any clip until all clips have been selected and without tracking those clips already selected.

Figure 15:
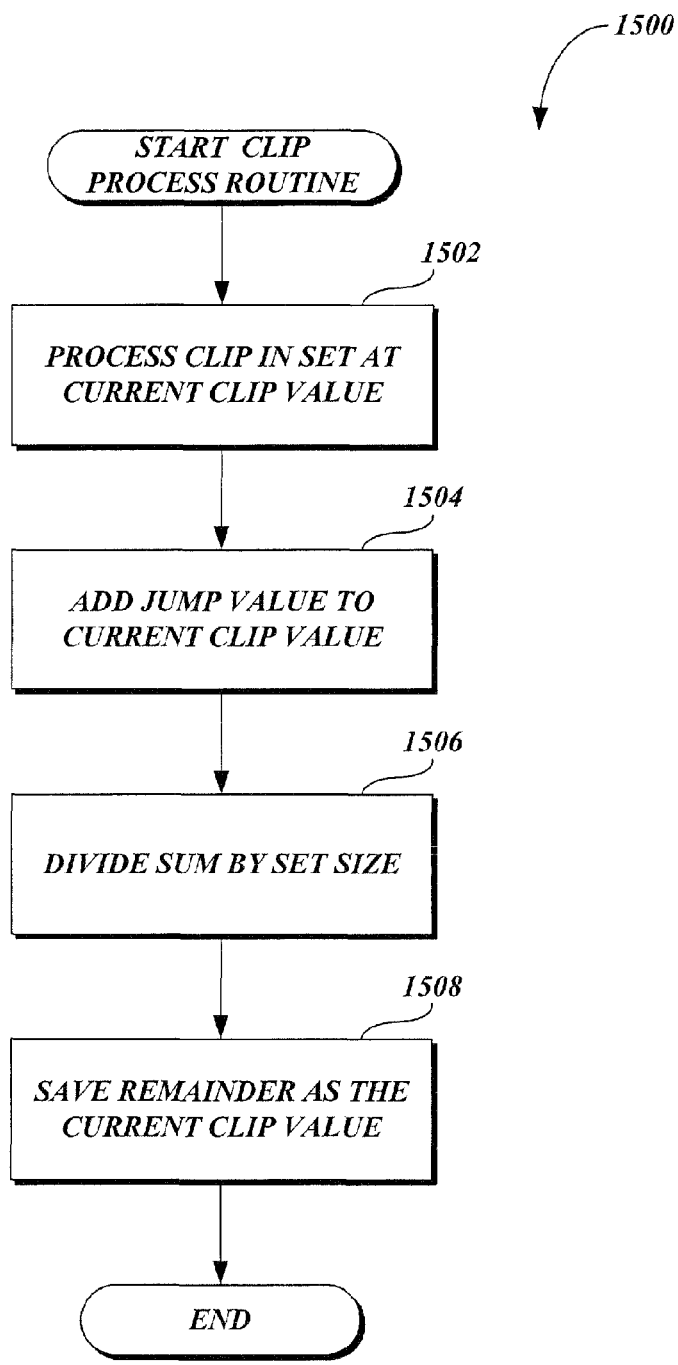
FIG. 15 is a flow diagram illustrating an exemplary clip process routine suitable for selecting and processing a clip in a set of clips as part of the process of shuffling through all clips in the set, without tracking those clips already displayed, and without repeats.

FIG. 15 is a flow diagram illustrating an exemplary clip process routine 1500 suitable for selecting and processing a clip from a set of clips as part of the process of shuffling through all clips from the set of clips without tracking those clips already displayed, and without repeats. At block 1502, a clip from the set of clips, at the position identified by a current clip value, is selected and played. After playing the clip, at block 1504, the jump value is added to the current clip value. At block 1506, the sum of the current clip value and jump value is divided by the set size. As previously described, this division is whole integer division. At block 1508, the remainder of the previous division is stored as the current clip value for use in a subsequent call to the exemplary clip process routine 1500. Thereafter the exemplary clip process routine 1500 terminates. Repeatedly using the exemplary clip process routine 1500 results in the selection and processing of all of the clips in a set of clips before any clips are repeated.

Figure 16:
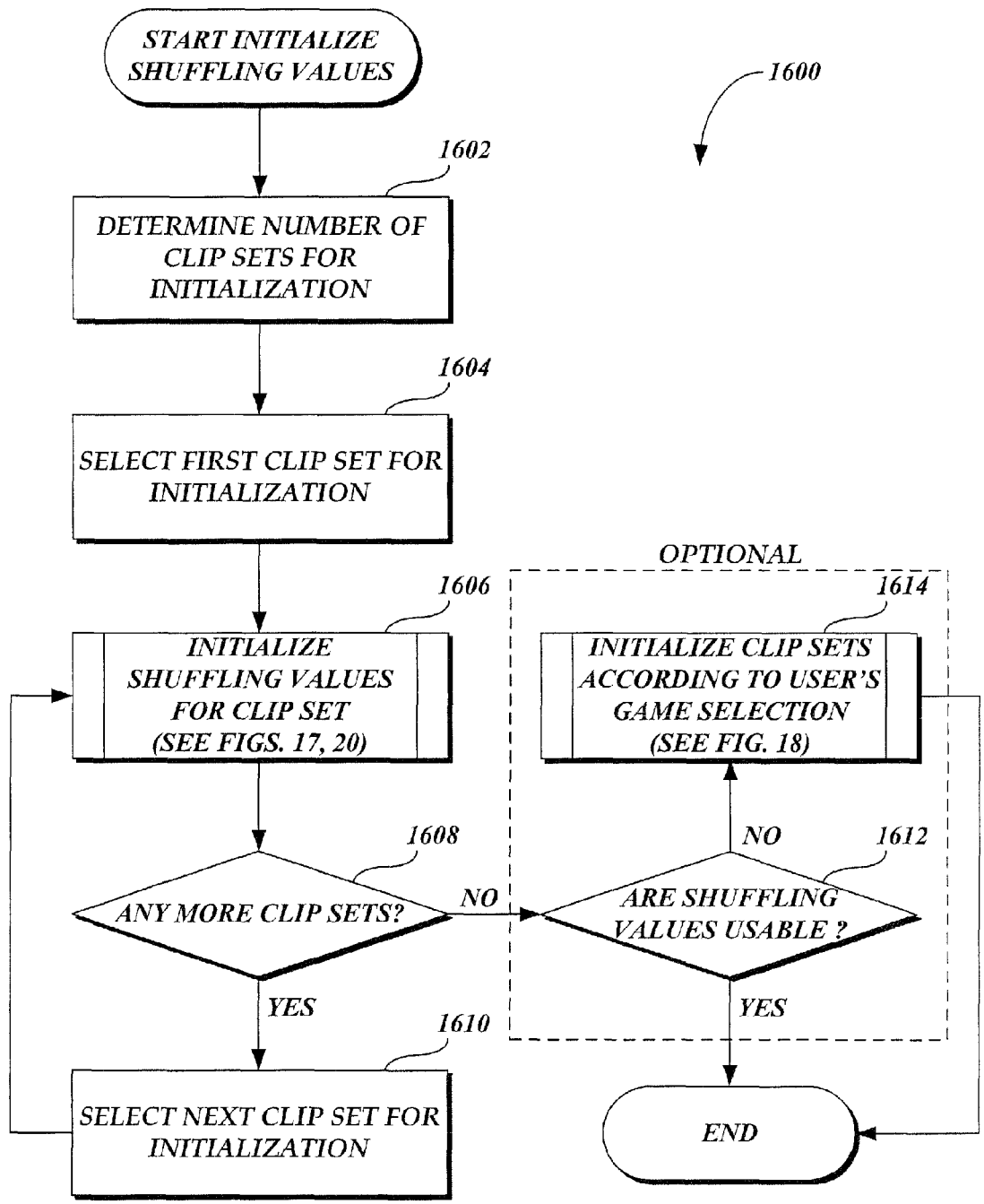
FIG. 16 is a flow diagram illustrating an exemplary initialize shuffling values routine for initializing shuffling values corresponding to multiple sets of clips.
Figure 17:
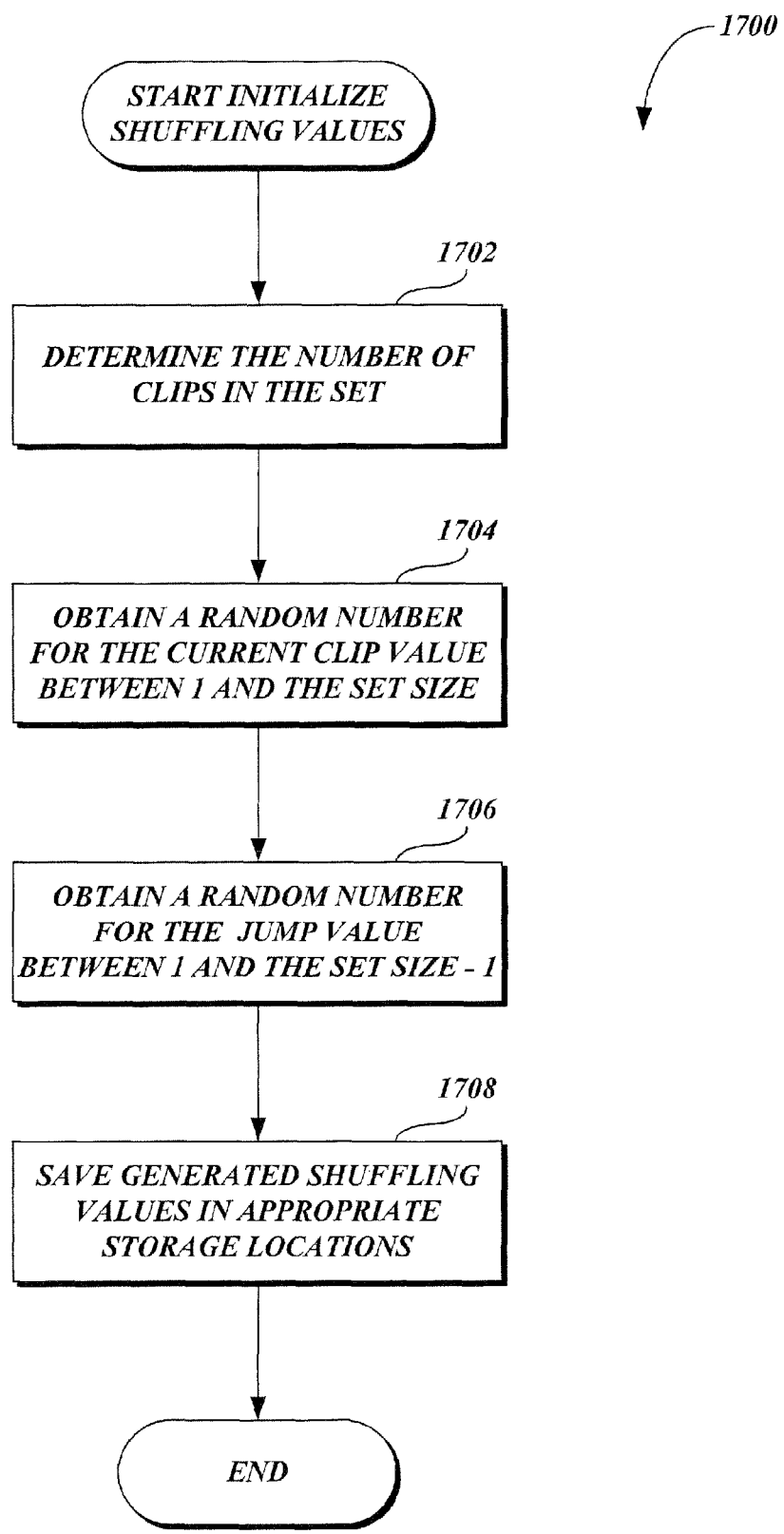
FIG. 17 is a flow diagram illustrating an initialize shuffling values routine for initializing values necessary to randomly shuffle through a set of clips.
Figure 20:
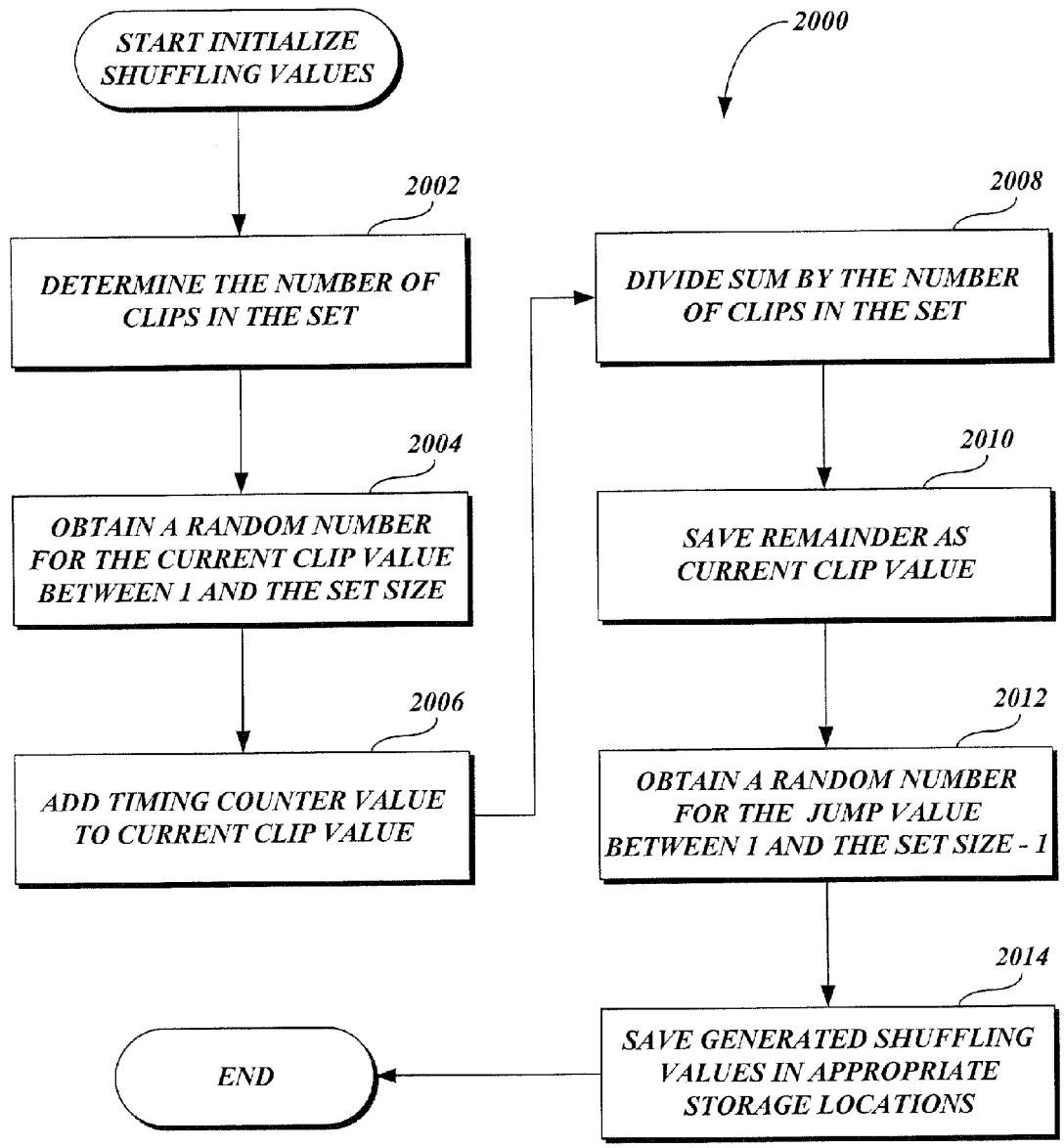
FIG. 20 is a flow diagram illustrating an alternative initialize shuffling values routine for initializing values necessary to randomly shuffle through a set of clips.

FIG. 16 is a flow diagram illustrating an exemplary initialize shuffling values routine 1600 for initializing shuffling values corresponding to multiple sets of clips. Beginning at block 1602, a determination is made as to how many sets of clips are to be initialized, or, more precisely, how many sets of shuffling values are to be initialized. For ease of understanding purposes, initializing shuffling values for a set of clips will be generally described as initializing a clip set. At block 1604, the first clip set is selected for initialization. At block 1606, the shuffling values corresponding to the clip set are initialized. Exemplary initialize shuffling values for clip sets are illustrated in FIGS. 17 and 20, and described below. As previously discussed, shuffling values are stored in general registers, and the number of clip sets concurrently accessible is limited by the number of general registers. Thus, the executing DVD program must track which shuffling values/general registers correspond to a clip set, and ensure that the shuffling values are stored accordingly. For example, general registers 1 and 2 may contain shuffling values for a first set of clips, general registers 3 and 4 may contain shuffling values for a second set of clips, etc. Any combination of registers may be used.

At decision block 1608, a determination is made whether there are any more clip sets to be initialized. If there are more clip sets to be initialized, at block 1610 the next clip set is selected. Thereafter, the process returns to block 1606 to initialize the shuffling values for the selected clip set. These steps are repeated until, at block 1608, the determination is made that all the clip sets have been initialized.

Preferably, the shuffling values, i.e., the jump value and current clip value, are initialized with truly random numbers. By initializing the shuffling values with true random numbers, random shuffling through a clip set is achieved. However, when a serviceable random number generator is not available on a DVD player, i.e., one that frequently generates 1, other techniques may optionally be employed to initialize the shuffling values, thereby simulating random shuffling through a set of video clips.

Decision block 1612 and block 1614 represent optional steps of detecting unusable random numbers and initializing the shuffling values according to a user's game selection. Thus, at decision block 1608, if there are no more clip sets to be initialized, the routine 1600 may terminate. Optionally, at decision block 1612, a determination is made as to whether the shuffling values are usable. As previously mentioned, one way to determine whether the random numbers are unusable is detecting if more than one 1 is generated as a random number. Those skilled in the art will readily recognize that other techniques may alternatively be employed. If at decision block 1612, the shuffling values are usable, i.e., appear to represent truly random values, the routine terminates. Alternatively, if the shuffling values appear unusable, at block 1614, the clip sets' shuffling values are initialized according to a user's game selection. A more detailed description of initializing the clip sets' shuffling values according to a user's game selection is described below in regard to FIG. 18.

FIG. 17 is a flow diagram illustrating an initialize shuffling values routine 1700 suitable for use in FIG. 16 for initializing values necessary to randomly shuffle through a set of clips. Beginning at block 1702, the total number of clips in the set (or table) is determined. According to one embodiment, the total number of clips in the set must be a prime number. At block 1704, a random value is obtained as the current clip value. The current clip value represents the next clip in the set of clips to be processed. The current clip value is a number greater than or equal to one and less than or equal to the set size. With reference to the previous example, if the set size is 239, the current clip value must be greater than or equal to 1, and less than or equal to 239.

At block 1706, a random value is obtained as the jump value. The jump value is used, in conjunction with the modulo function described above, to move the current clip value to reference a new clip in the set of clips. The jump value is a number greater than or equal to one and less than or equal to the set size minus one. For example, if the set size (i.e., the total number of clips in the set) is 239, the jump value must be greater than or equal to 1, and less than or equal to 238. At block 1708, the shuffling values, i.e., the current clip value and the jump value, are stored in appropriate registers corresponding to a particular clip set on the DVD player. Thereafter, the routine 1700 terminates.

Using the shuffling values, in conjunction with the modulo function already described, shuffling of clips in a set of clips can be achieved without any repeats, at least until all clips have been selected. However, while the example above in regard to FIG. 17 describes the set size as a prime number, it is not necessary that the set size be limited to prime numbers. In order to shuffle through clips in a set using the modulo function, the jump value, even when randomly generated, must be constrained to certain values. More specifically, the jump value must be constrained to values such that the greatest common denominator between the jump value and the set size is 1. When the set size is a prime number, any number chosen for the jump value between 1 and the set size minus one will have a greatest common denominator of 1. Alternatively, if the set size is 200 (i.e., not a prime number), jump values such as 1, 3, 7, 9, 11, 13, 17, 19, 21, 23, 27, 29, 63, 99, 143, and 199, to name just a few, would be appropriate.

Certain DVD players utilize a predetermined seed value in generating random numbers. Thus, even while the random number generator for these DVD players is capable of generating usable random numbers, using the predetermined seed causes the random numbers to be generated in the same order each time the DVD player is started. For example, after starting such DVD players, a typical first set of random numbers generated between 1 and 5 may be 3, 5, 2, 1, 4. If the same DVD player is shut down and later restarted, because the same seed value is used to generate random numbers, the first set of random numbers generated between 1 and 5 would again be 3, 5, 2, 1, 4. Consequently, a second repetition of a game, using the random shuffling techniques described herein, would cause the same selection of clips to be repeated each time the DVD player is started. In order to alleviate this problem, an alternative initialize shuffle values routine may be used.

FIG. 20 is a flow diagram illustrating an alternative initialize shuffling values routine 2000 for initializing values necessary to randomly shuffle through a set of clips. Beginning at block 2002, the number of clips in the set is determined. At block 2004, a random number for the current clip value is obtained, the value being between 1 and the size of the set. The random number is obtained by executing a call to a DVD system routine that returns a random number. In this regard, as well known and thus familiar with DVD players, all DVD players are required to include such a system routine. When the system routine is called, a random number is returned.

At block 2006, a timing counter value is obtained and added to the current clip value. While a timing counter value may be determined in a variety of ways, one way of determining a timing counter value is by running a timing initialization routine on the DVD player at startup. An exemplary method of obtaining a timing counter value in this way is illustrated in FIG. 21 and described below.

Figure 21:
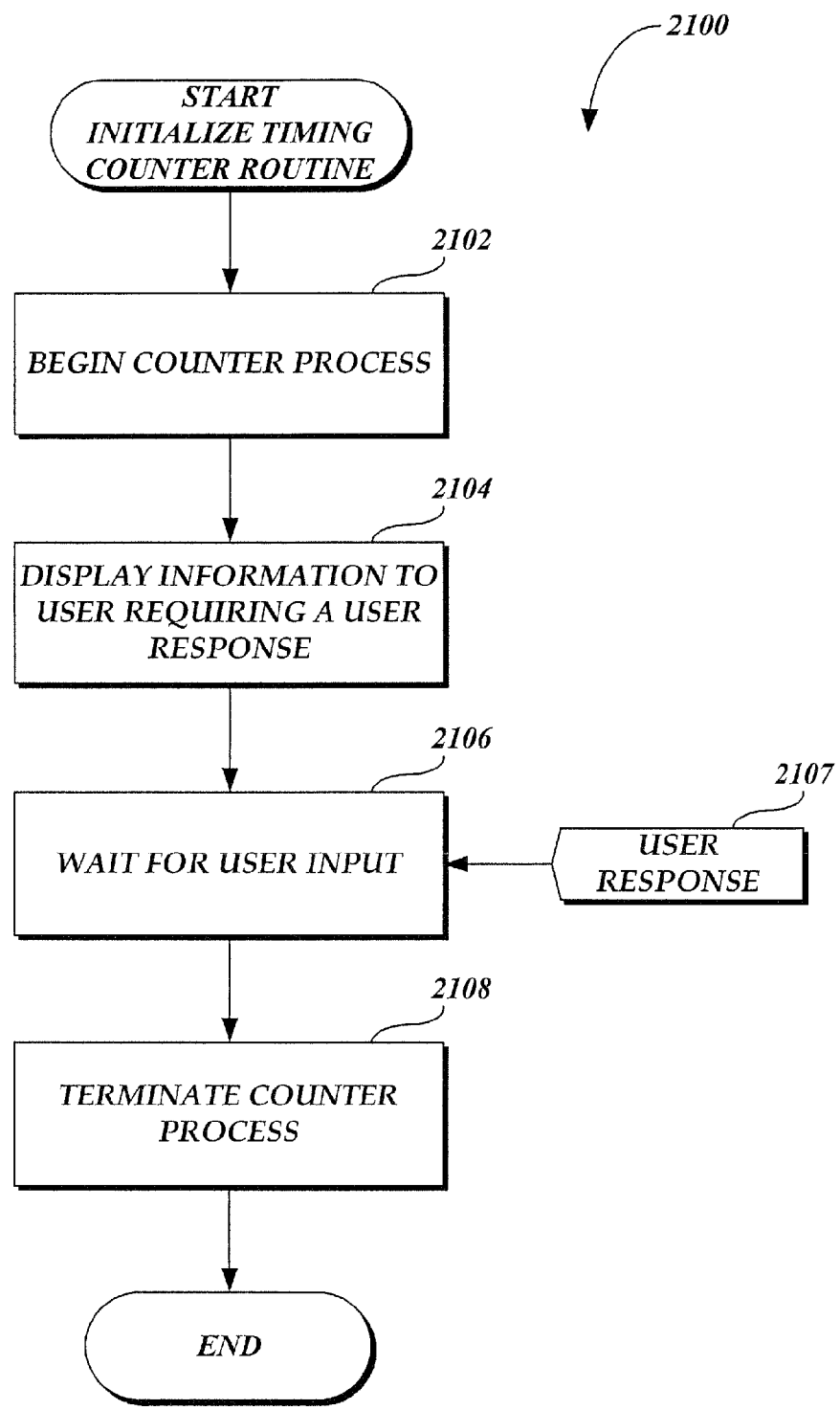
FIG. 21 is an exemplary timing initialization routine for execution upon startup to establish a timing counter for use in initializing shuffling values.

FIG. 21 is an exemplary timing initialization routine 2100 for determining a timing counter value for use in the initialize shuffling values routine illustrated in FIG. 20. The routine is included in the startup code found on the DVD disc, and utilizes variances in user responsiveness to provide a "random" timing counter. Beginning at block 2102, a counter process is started that periodically increments the value stored in a general register until the process is terminated. At block 2104, with the counter process running, information is displayed to the user requiring the user's response. For example, the displayed information may be the main menu, which requires a user to select a game or option. At block 2106, the routine 2100 awaits a user response 2107. After receiving the user's response 2107, the counter process is terminated at block 2108. Thereafter, the routine 2100 terminates. The value stored in the general register when the process terminates is the timing counter value employed in block 2006 of FIG. 20.

Referring back to FIG. 20, at block 2008, the modulo function is applied to the sum of the current clip value and the timing counter value, i.e., the sum is divided by the number of clips in the set. At block 2010, the result of the modulo function, i.e., the remainder of the division, is saved as the current clip value. At block 2012, a random number is obtained in the same manner as in block 2004 as the jump value, the random number being greater than or equal to one, and less than or equal to the set size minus one. At block 2014, the shuffling values, i.e., the current clip value and the jump value, are saved in the appropriate general registers for later use. Thereafter, the routine terminates. Incorporating a timing counter in the initialization routine whose value is controlled by varying user response times introduces an added element of randomness to the initialized shuffling values. It should be noted that while any registers may be used, the program utilizing the shuffling values must remember which registers correspond to the shuffling values for a clip set. For example, general register 1 may contain the current clip value, while general register 4 may contain the jump value.

While the above described processes of initializes shuffling values for a single set of clips, those skilled in the art will recognize that multiple sets of clips require multiple initialized shuffling values. For example, the game described above utilizes four separate sets of clips. For each set of clips, shuffling values must be initialized. However, because each shuffling value uses a general DVD register, and because the number of general DVD registers is limited, the number of available clip sets is correspondingly limited. As the number of available DVD registers is increased in future DVD players, larger numbers of clip sets will become available. Currently, most DVD players have 16 general registers available for programmable use.

Figure 18:
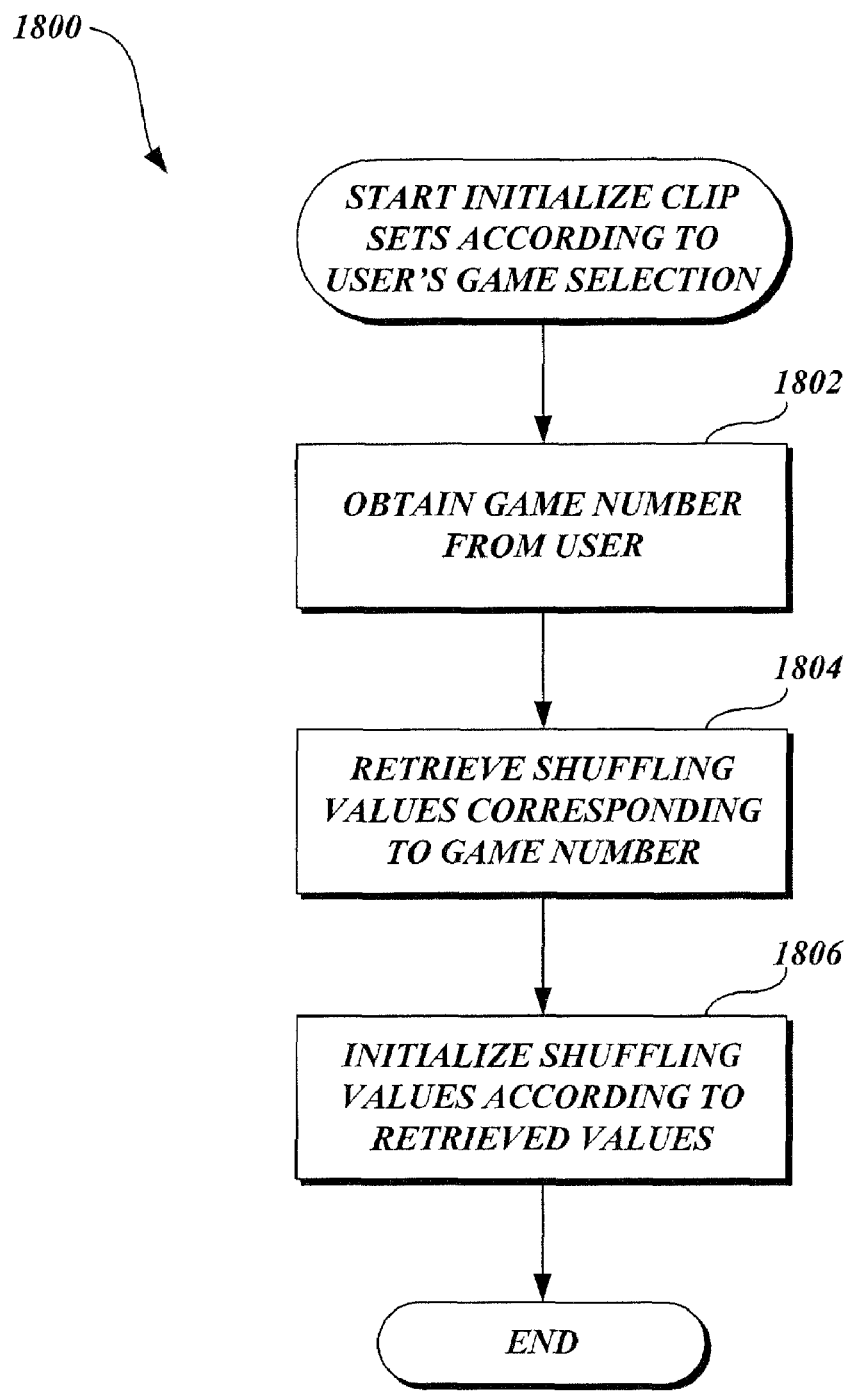
FIG. 18 is a flow diagram illustrating an exemplary initialize clip sets routine for initializing the clip sets' shuffling values according to a user's game selection.

FIG. 18 is a flow diagram illustrating an exemplary initialize clip sets routine 1800 suitable for use in FIG. 16 for initializing the clip sets' shuffling values according to a user's game selection. At block 1802, a game number selection is obtained from a user. This game number corresponds to an entry in an initial values table, described below in regard to FIGS. 19A and 19B and stored on a DVD. At block 1804, predetermined shuffling values in an entry in the initial values table corresponding to the user's selected game number are retrieved from the DVD.

Each entry in the initial values table includes shuffling values, i.e., a current clip value and a jump value, for each clip set to be used in initializing the shuffling values. Additionally, an initial values table entry may contain a plurality of shuffling values pairs, each pair corresponding to a clip set to be initialized. Alternatively, each entry in the initial values table may contain a single set of shuffling values to be used for each clip set to be initialized. Preferably, each set of clips should have its own shuffling values, whether they are initialized from a single set of shuffling values or multiple pairs of shuffling values. At block 1806, the retrieved shuffling values are stored in the appropriate general registers for the clip sets. Thereafter, the routine 1800 terminates.

Figure 19A:
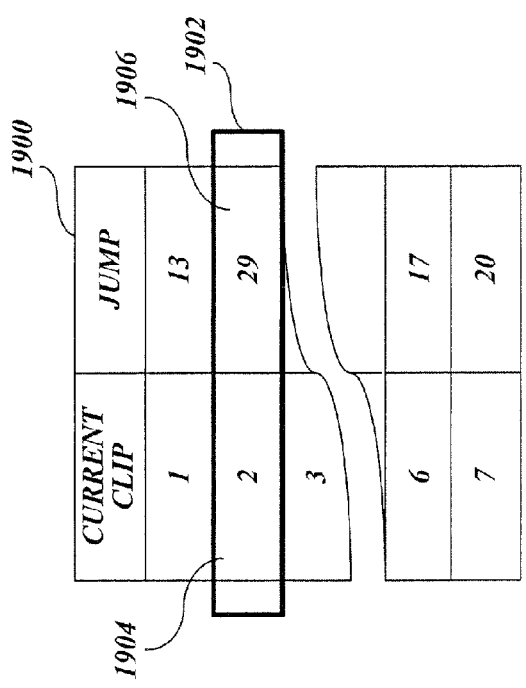
FIGS. 19A and 19B are diagrams illustrating exemplary initial values tables according to the present invention.

FIG. 19A is a diagram illustrating an exemplary initial values table 1900 formed in accordance with the present invention. The initial values table 1900, includes two columns of values: a current clip value column and a jump value column. Those skilled in the art will recognize that the column headings "Current Clip Value" and "Jump Value" are shown in the table 1900 for illustration purposes only and do not exist in the initial values table 1900 stored on the DVD disc 106. Each row represents an entry in the initial values table 1900 corresponding to a game number. Each entry comprises a pair of shuffling values: a currently clip value, and a jump value.

As shown by the bold outline in the illustrated initial values table 1900, the game corresponding to entry 1902 has a predetermined current clip value 1904 of "2" and a predetermined jump value 1906 of "29." As there are only two values per entry in the illustrated initial values table 1900, the pair of values in each entry is used to initialize the shuffling values for each clip set to be initialized. When the previously generated shuffling values stored on the DVD in the initial values table 1900 are employed by a DVD player 102 incapable of generating useable random numbers, apparent random selection of the clips in the clip sets is achieved for different game selections. However, it is left up to the players to choose a different game, or repeat the game they have previously played if they so desire. In one embodiment of the invention, the number entries in the initial values table 1900 is determined according to the average number of plays required for a typical game and the number of clips available in a table.

As mentioned above, a single initial values table, such as table 1900, may be used to initialize the DVD player 106 to randomly shuffle through multiple clip sets on a DVD disc 106. While it is not necessary that each clip set on a DVD disc 106 be the same size, i.e., have the same number of clips, if the sets are not similarly sized, and when each entry has only two values, a predetermined current clip value and a predetermined jump value, these values must be able to operate within the smallest clip set. That is, when there is only one pair of shuffling values to initialize multiple sets, the predetermined current clip value can be no greater than the number of clips in the smallest set. Correspondingly, the predetermined jump value can be no greater than the number of clips in the smallest set minus one.

Figure 19B:
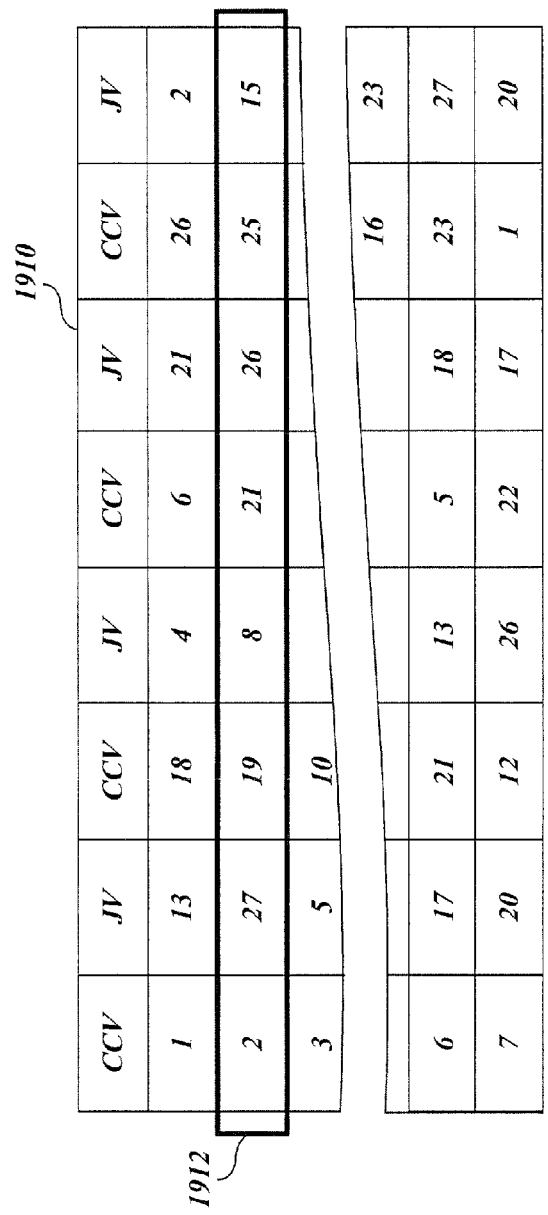

As previously described, an initial values table may alternatively include separate shuffling values pairs for each clip set on the DVD disc 106, per each entry in the initial values table. FIG. 19B is a diagram illustrating an exemplary initial values table 1910 having multiple shuffling values pairs corresponding to multiple clip sets, for each entry in the initial values table. Specifically, each entry in the initial values table 1910 contains shuffling values for four clip sets stored on the DVD disc 106. For example, with reference to bolded entry 1912, the shuffling values for a first clip set would be initialized to "2" and "27," the shuffling values for a second clip table would be initialized to "19" and "8," the shuffling values for a third clip table would be initialized to "21" and "26," and the shuffling values for a fourth clip table would be initialized with "25" and "15."

Predetermined shuffling values may be generated in such a way as to control the selection of clips in the set according to a user's game selection. For example, assuming that a user will typically choose game number one when playing the game for the first time, the selection of clips during the first game can be controlled by directing the shuffling values to specific locations in the clip set, and by correspondingly locating certain clips in the clip table to be selected. Thus, a game provider may place those clips most likely to ensure that the users will be pleased with the game in the initial values table entry corresponding to game one. Similar control may be exercised over subsequent games as well. By judiciously setting the shuffling values and locating clips within the set, a game provider may optimize the selection of clips to minimize a repeat selection of a clip between games, and present an optimal mix of types of clips in those games. Additionally, because a game provider can control the selection of content and ensure no repeated selection of clips among a certain number of games, the game provider may provide an option for a user to select one of the predetermined games, even when the DVD player 102 is capable of generating good random numbers.

Figure 22:
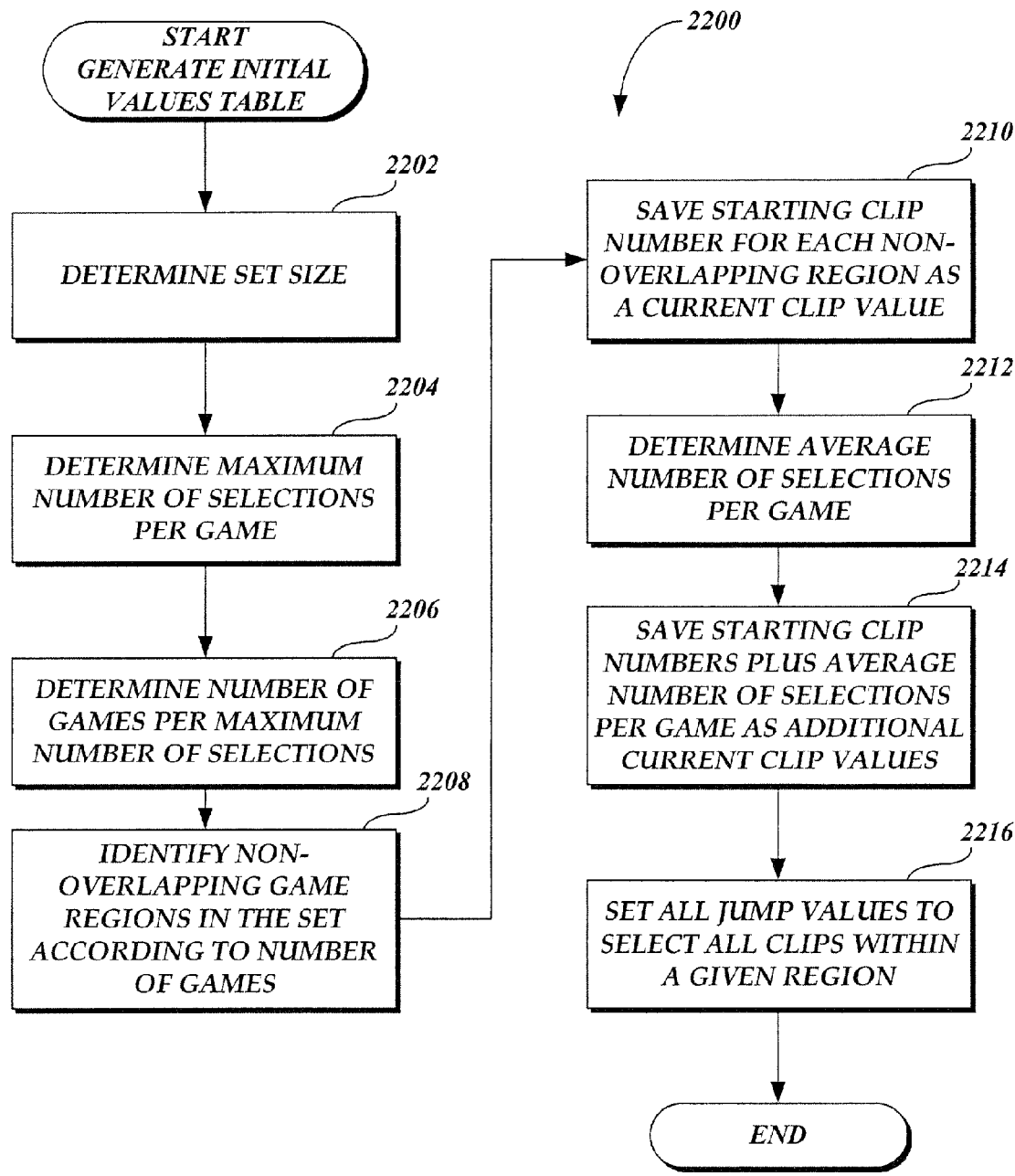
FIG. 22 is a flow diagram illustrating an exemplary generate initial values table routine for creating an initial values table to minimize overlaps between user selected sessions and maximize the number of games available.

FIG. 22 is a flow diagram illustrating an exemplary generate initial values table routine 2200 for creating an initial values table that minimizes overlaps between user selected games, or sessions, and maximizes the number of games available. Beginning at block 2202, the clip set size is determined, i.e., the number of clips in the clip set is determined. At block 2204, a maximum number of clip selections per games is determined. Preferably, the maximum number is based on an analysis of previously played games. However, the maximum number may not correspond to the theoretical maximum of all clips in the clip set. Instead, the maximum number may be set according to some percentile. For example, a maximum value of 30 selections may be sufficient for 98 percent of the previous games observed. Those skilled in the art will appreciate that other methods for determining a maximum number of selections may alternatively be used.

At block 2206, a number of games that may be played from the clip set without repeats (assuming the maximum number of selections per game) is determined by dividing the set size by the maximum number of selections, using whole integer division. For example, if the set size is 239 and the maximum number of selections is 30, the number of whole games for the clip set is seven. At block 2208, non-overlapping game regions of the clips are identified for each game. Each non-overlapping game region corresponds to a game number and contains the maximum number of clips. At block 2210, a starting clip number for each non-overlapping game region is stored in an initial values table as a current clip value.

Because the average number of selections used during a game is typically less than the maximum number of selections, the non-overlapping game regions will likely contain clips that were not selected during a game. Thus, at block 2212, the average number of selections per game is determined. As with the maximum number of selections per game, the average number may be determined by analyzing previous games. At block 2214, the previously saved (block 2210) current clip values plus the average number of selections per game are stored in the initial values table as additional current clip values. For example, if the average number of selections is fifteen and the first non-overlapping game region begins at clip one, a new current clip value is set at sixteen. Offsetting the current clip values by the average number of selections per game allows a game provider to "recover" unused clips from the first set of games and use the recovered clips to form a second set of games. Of course, those skilled in the art will recognize that some clips in the recovered regions used to form the second set of games may be repeated from the first set of games. At block 2216, the jump values are set to iterate sequentially. By iterating sequentially, each game is typically constrained to selecting clips from its corresponding region. Thereafter, the routine terminates.

FIG. 23A is a block diagram illustrating an exemplary initial value tables 2300 generated according to the generate initial values table routine 2200 of FIG. 22. For purposes of this discussion, it is assumed that the maximum selection number is 30, the average selection number is 15, and the set size is 239. It should be understood that these values are illustrative only, and should not be construed as limiting upon the present invention. Additionally, while the initial values table 2300 contains single shuffling values pairs, this should be taken as illustrative and not be construed as limiting on the present invention. As previously discussed, entries in an initial values table may contain a single shuffling values pair, or multiple shuffling values pairs.

Based on the exemplary set size (239) and the maximum number of selections per game (30), the set is divided into seven complete games (239÷30=7.96 of which the integer value is 7). Accordingly, seven non-overlapping regions are identified. The starting values for these regions are saved as current clip values, as shown in the initial values table 2300. More specifically, as shown in FIG. 23A, starting values are identified as 1, 31, 61, 91, 121, 151, and 181, the non-overlapping clip regions being 1-30, 31-60, 61-90, 91-120, 121-150, 151-180 and 181-210, respectively. While these regions are contiguous, this should be taken as illustrative and not be construed as limiting upon the present invention.

Next, in accordance with block 2214, each starting value of a non-overlapping region is offset by the previously determined (block 2212) average number of selections per game (15) and saved as another current clip value in the initial values table 2300. For example, entry 2306 corresponding to entry 2302 has a current clip value of 16, and entry 2308 corresponding to entry 2304 has a current clip value of 46. The other starting values for the non-overlapping regions are similarly offset and entered into the initial values table. Thus, clip regions for two sets of games, each seven games long, are created.

The jump value for each entry in the initial values table 2300 is set at one. By setting the jump value to one, each game will iterate sequentially through the identified region of clips, thereby ensuring no repeats for the first set of games, i.e., those with starting values corresponding to the start of the non-overlapping regions. Thus, according to the FIG. 23A example, the first seven games selected from initial values table 2300 should not repeat any clips.

It should be noted that when the set size is a prime number, there will always be a remainder, except when the maximum number of selections is equal to the set size. The "extra clips," i.e., those not located within one of the non-overlapping game regions, may be distributed between the non-overlapping game regions, or alternatively, may be collected together and employed in other ways in an initial values table.

Figure 23B:
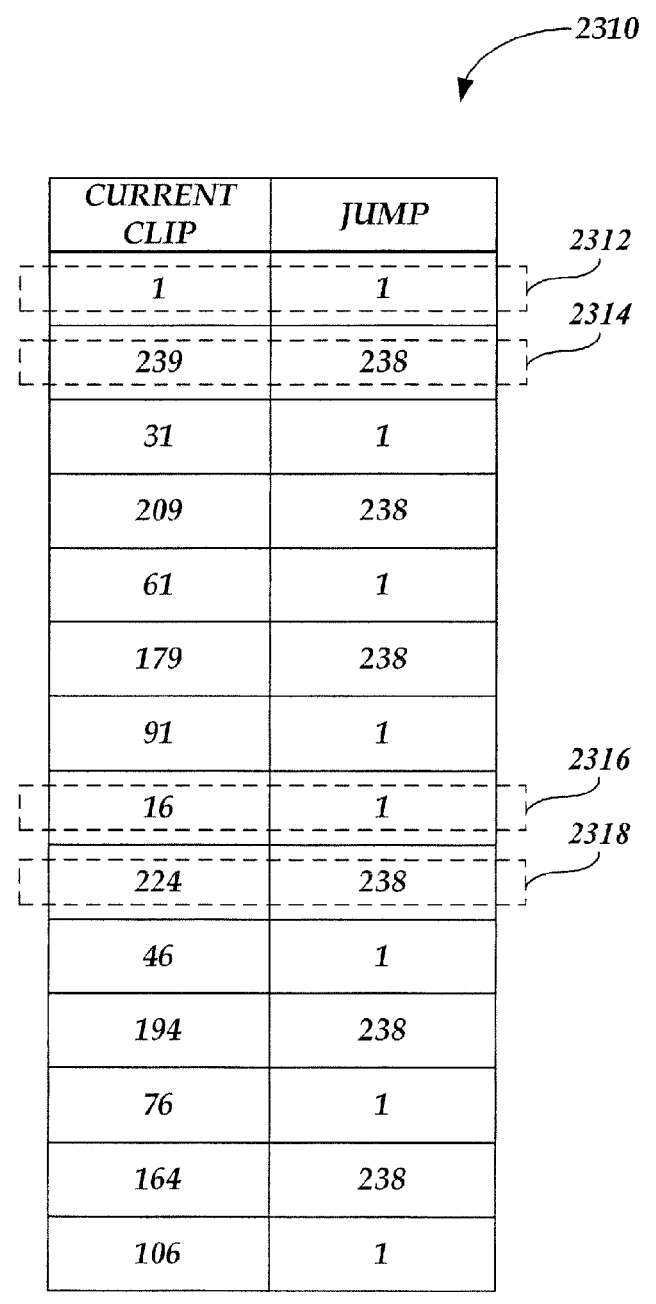

FIG. 23B is a diagram illustrating an alternative exemplary initial value table 2310 generated by the generate initial values table routine 2200 illustrated in FIG. 22 and discussed above. For purposes of this discussion, it is again assumed that the maximum selection number is 30, the average selection number is 15, and the set size is 239. Accordingly, based on the set size and the maximum number of selections per game, the clip set is divided among seven complete games. However, rather than running sequentially from the beginning of the set, the clip sets move inwardly from both ends. Thus, the starting values are identified as 1, 239, 31, 209, 61, 179, and 91, and the non-overlapping clip regions are 1-30, 239-210, 31-60, 209-180, 61-90, 179-150 and 91-120. As noted above, in contrast to the regions identified above in regard to FIG. 23A, these regions are not sequential. Additionally, the iteration through some of the non-overlapping regions is made in a descending manner. For example, entry 2312 has a current clip value of 1. The next entry 2314 has a current clip value of 239, referencing the final clip in the clip set, requires a reverse iteration in order to avoid repeating clips beginning at position 1 in the clip set.

After identifying the first set of current clip values, as with FIG. 23A, the starting values of the non-overlapping regions of the first set of current clip values are offset by the average number of selections per game and saved as a second set of current clip values in the initial values table 2310. As shown in FIG. 23B, some of the second set of current clip values are determined by adding the average number of selections per game to a starting value taken from the first set of current clip values. See, for example, entry 2316, which corresponds to entry 2312. For others, specifically those whose iteration is to be performed in reverse order, the current clip values are determined by subtracting the average number of selections per game to the starting value taken from the first set of current clip values. See, for example, entry 2318, which corresponds to entry 2314.

After establishing the current clip values for the initial values table 2310, the jump values are set such that during the play of a game, clips are iteratively selected from their particular region. For example, entries 2312 and 2316 have jump values of 1, which will cause the selection of clips to be performed iteratively in an ascending order in their regions. Alternatively, entries 2314 and 2318 have jump values of 238, the maximum value for a jump value for the particular clip set. As previously discussed, adding the maximum jump value to a current clip value and applying the modulo function has the net effect of subtracting one from the current clip value. Thus, the jump values for entries 2314 and 2318 could have alternatively been written as "−1."

While FIGS. 23A and 23B illustrate two alternatives patterns of non-overlapping regions in a clip set, those skilled in the art will readily recognize that other patterns of non-overlapping regions may be utilized without departing from the scope of the present invention. Accordingly, the above examples should be construed as illustrative, and not as limiting upon the present invention.

While the above routines and examples are described in terms of clips stored on a DVD disc 106 for play by a DVD player, those skilled in the art will appreciate that the above identified shuffling mechanism is not limited to DVD players. The shuffling mechanism may be applied to other devices that require shuffling through a set of objects without tracking those objects already processed, and without repeats.

Figure 24:
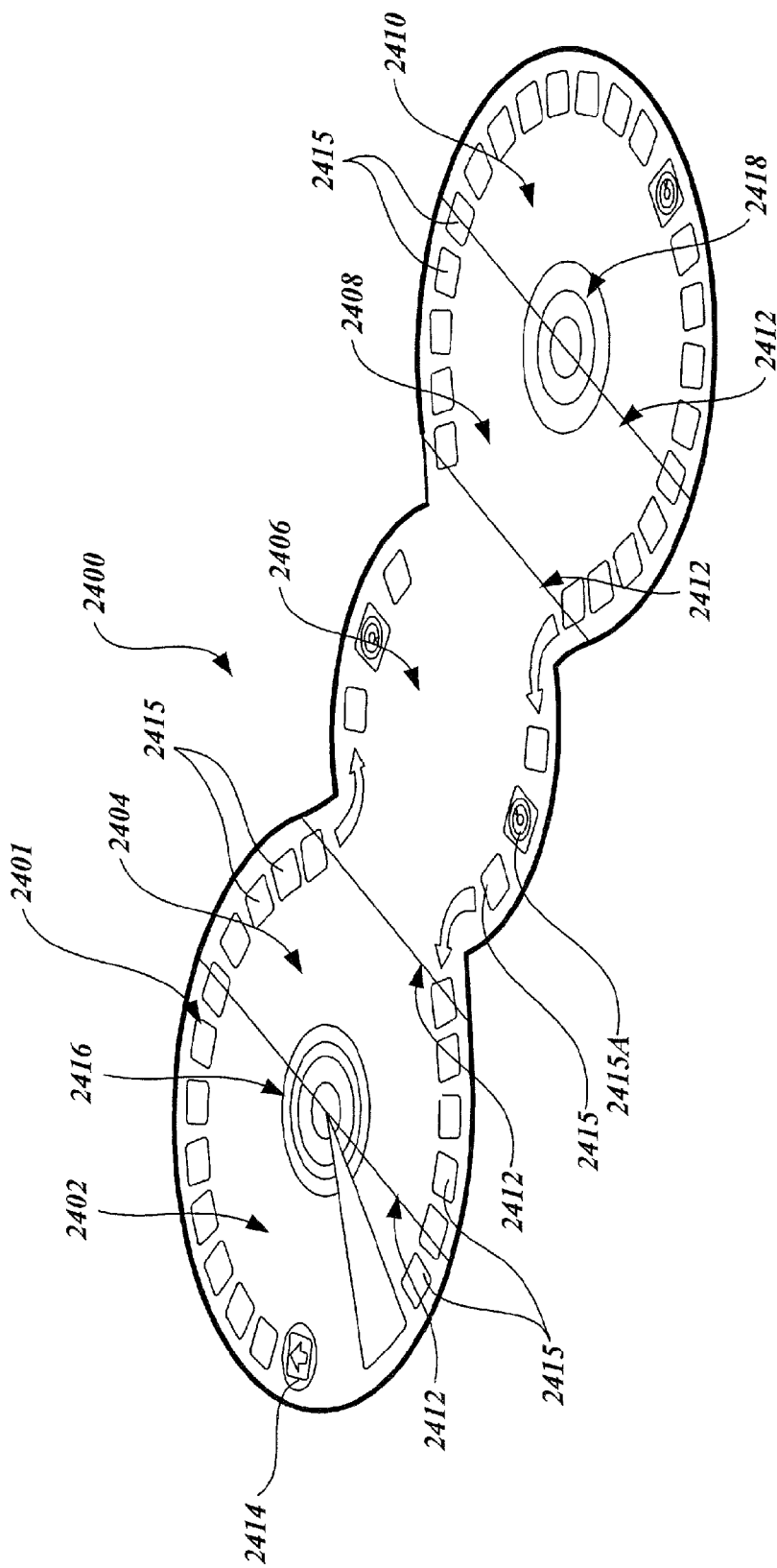
FIG. 24 is a diagram illustrating an exemplary game board capable of providing both long and short play, in a long play arrangement.

FIG. 24 is a diagram illustrating an exemplary game board 2400 capable of providing both long and short play, in a long play arrangement. The game board 2400 is comprised of five planar sections 2402-2410 lying in a common plane. The planar sections include two end sections 2402 and 2410, two intermediate sections 2404 and 2408, and a center section 2406. The planar sections 2402-2410 are joined by flexible hinges 2412. The perimeter of the game board 2400 has a continuous path 2401 with a begin region 2414 and a three ring end region 2416, and multiple intermediate spaces 2415, which may include some double play spaces 2415A. The begin region 2414 and the three ring end region 2416 must reside at least partially on an endmost section of the game board 2400, such as planar section 2402. As can be seen in the diagram, the three ring end region 2416 resides partially on planar sections 2402 and 2404, planar section 2402 being an endmost section. A corresponding mark 2418 is found on planar section 2410 for short play, as described below.

Figure 25:
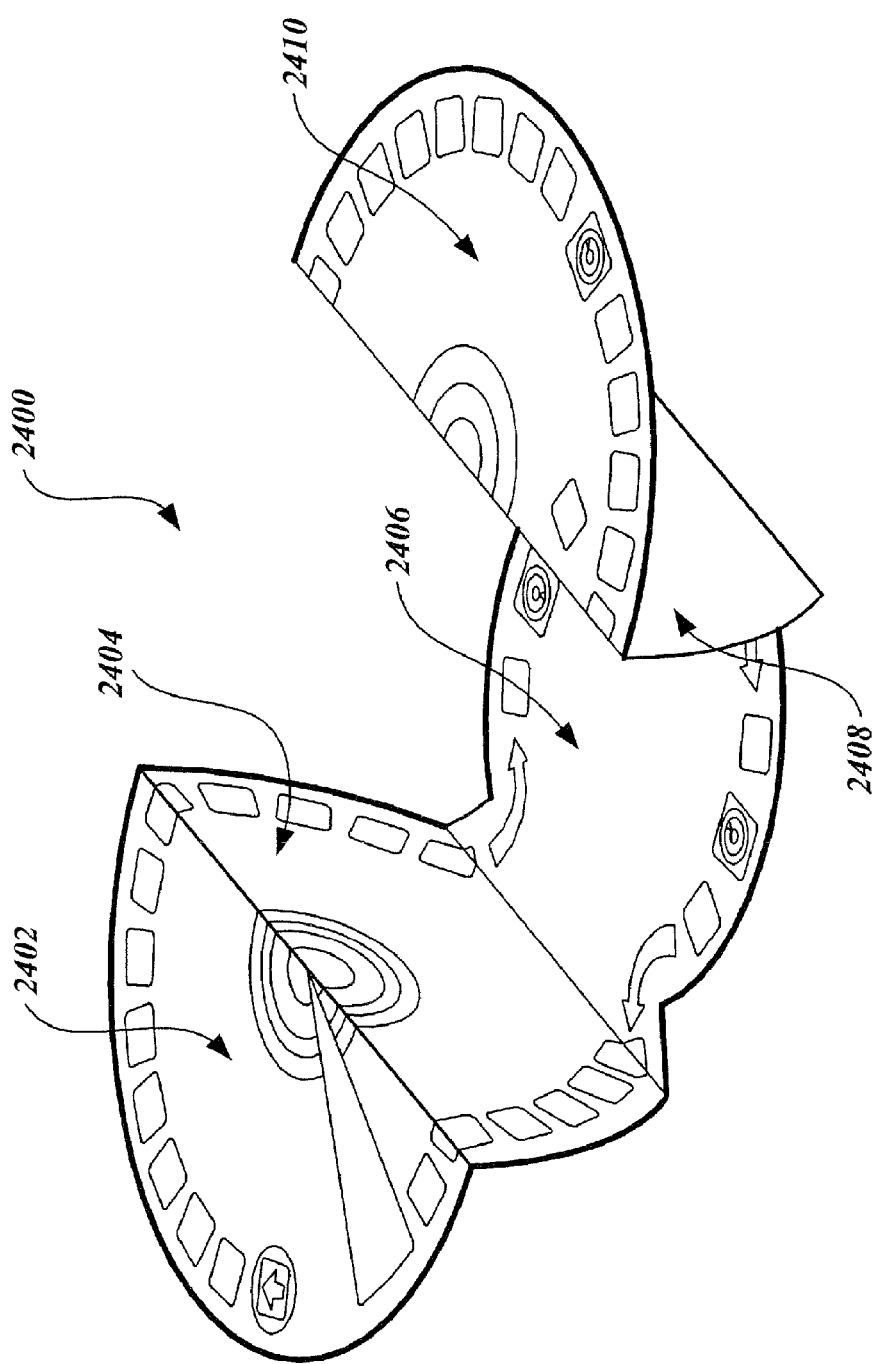
FIG. 25 is a diagram illustrating the exemplary game board of FIG. 24 partially folded between short and long play arrangements.

FIG. 25 is a diagram illustrating the exemplary game board 2400 shown in FIG. 24 partially folded between short and long play arrangements. To rearrange the game board 2400 from long to short play arrangement, the endmost planar sections, 2402 and 2410, are lifted up and moved towards each other, over the intermediate planar sections 2404-2408 in an accordion manner.

Figure 26:
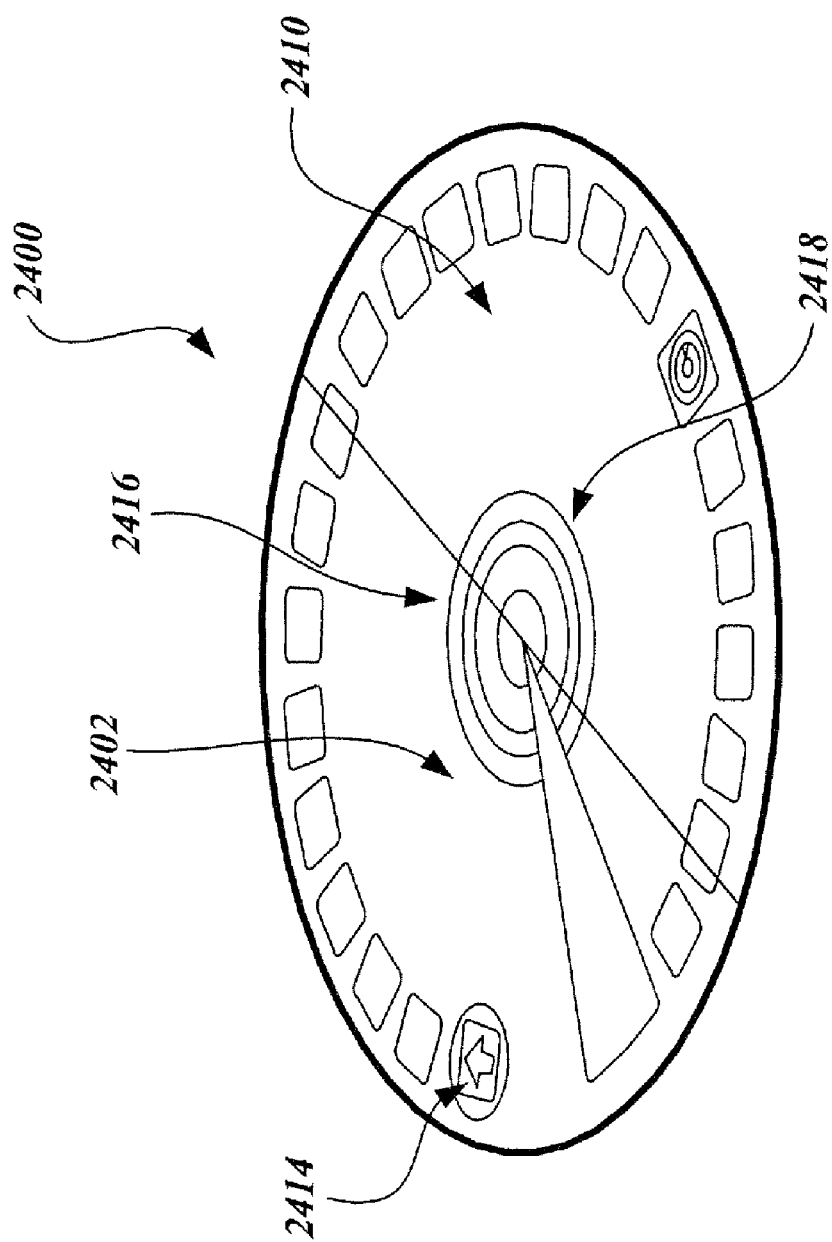
FIG. 26 is a diagram illustrating the exemplary game board of FIG. 24 in a short play arrangement.

FIG. 26 is a diagram illustrating the exemplary game board 2400 shown in FIG. 24 arranged for short play. In this configuration, the endmost planar sections, planar section 2402 and 2410, can be seen and used as a playing surface. More specifically, the endmost planar sections 2402 and 2410 lie in a common plane above a common plane defined by the intermediate sections 2404 and 2408, which lies above a plane defined by the center section 2406. The peripheries of the sections 2402 and 2410 are such that the borders of the sections coincide with one another. The path has been drawn on all sections of the game board 2400 such that when arranged for short play or long play, it appears as a single, continuous path. Additionally, the end region 2416 that resided on section 2402 and section 2404 still appears as a single, unbroken area residing now on sections 2402 and 2410 by blending with the corresponding mark 2418 on section 2410.

While illustrative embodiments have been illustrated and described, it will be appreciated that various changes can be made therein without departing from the spirit and scope of the invention.

The embodiments of the invention in which an exclusive property or privilege is claimed are defined as follows:

1. A game comprising:
   a board containing a path of travel;
   a plurality of player identification pieces; and
   a DVD-Video disc storing content in a DVD video format, the content containing a plurality of player puzzles and a control program, said control program controlling the operation of a DVD-Video player such that said control program causes said DVD-Video player to randomly access said puzzles in an interactive fashion during the playing of said game, wherein said puzzles are selected without repeats and without tracking previously selected puzzles
   wherein said control program includes a plurality of instruction modules;
   wherein said instruction modules include an initialization module for preparing the DVD player for playing the DVD;
   wherein said initialization module includes an initialization routine for determining if the DVD video player has a faulty random number generator; and
   wherein said instruction modules include a selection module for interacting with a user to select a set of predetermined initialization values when the initialization routine determines that the random number generator of the DVD video player is faulty.

2. A game as claimed in claim 1, wherein said puzzles include clips selected from the group consisting of video clips, audio clips, and audio/video clips.

3. A game as claimed in claim 2, wherein said clips are separated into tables.

4. A game as claimed in claim 3, wherein said tables include a My Play clips table, an All Play clips table, a Final Cut clips table, and a Sequentials clips table.

5. A game as claimed in claim 1, wherein said initialization module includes an initialization routine for randomly shuffling said clips.

6. A game as claimed in claim 1, wherein said player instruction modules also include a question selection module for selecting and displaying one of a plurality of questions associated with a clip.

7. A game as claimed in claim 1, wherein said player instruction modules also include a timer module for keeping track of, and displaying a countdown clock on a display device during the playing of said game.

8. A game as claimed in claim 1, wherein said player instruction modules also include a clip play module for retrieving and displaying clips and associated questions in accordance with a current clip value.

9. A game as claimed in claim 1, wherein said player instruction modules include a question selection module for selecting and displaying one of a plurality of questions associated with a clip.

10. A game as claimed in claim 1, wherein said player instruction modules include a timer module for keeping track of, and displaying a countdown clock on a display device during the playing of said game.

11. A game as claimed in claim 1, wherein said player instruction modules also include a clip play module for retrieving and displaying clips and associated questions in accordance with a current clip value.

12. A game as claimed in claim 1, wherein said game is a parlor game.

13. A game as claimed in claim 1, wherein said game is an educational, training, or promotional tool.

14. A game as claimed in claim 1, including a random choice piece for use by players to determine the distance of movement along the path of travel by said player identification pieces.

15. A game as claimed in claim 14, including a random challenge piece for use by players in determining the type of puzzles to be randomly accessed during the playing of said game.

16. A game as claimed in claim 1, including a random challenge piece for use by players in determining the type of puzzles to be randomly accessed during the playing of said game.

17. A game as claimed in claim 1, also including trivia question cards.

18. A game as claimed in claim 1, also including random move cards.

19. A game as claimed in claim 1 wherein said game board is changeable between a game board for long play and a game board for short play, wherein the game board comprises:
   a plurality of planar sections hingedly joined together such that said sections can be folded so as to overlie one another or unfolded to lie in a substantially common plane; and
   a game path located on selected surfaces of said planar sections, said game path forming a short play path when said sections are folded to overlie one another and a long play path when said sections lie in a substantially common plane.

20. A game as claimed in claim 19 wherein said plurality of planar sections include two end sections, two intermediate sections, and a center section.

21. A game as claimed in claim 20 wherein said end sections are hingedly attached to said intermediate sections and said intermediate sections are hingedly attached to said center section.

22. A game as claimed in claim 21 wherein said game path is located along the periphery of said plurality of planar sections.

23. A game as claimed in claim 22 wherein said plurality of planar sections include two end sections, two intermediate sections, and a center section.

24. A game as claimed in claim 23 wherein said end sections are hingedly attached to said intermediate sections and said intermediate sections are hingedly attached to said center section.

25. A game as claimed in claim 19 wherein said game path includes a begin region and an end region.

26. A game as claimed in claim 1, wherein said plurality of puzzles are formed by a set of clips stored on said DVD-Video disc and said control program selects and plays clips on a DVD-Video player selected from said set of clips, without tracking those clips that have been selected.

27. A game as claimed in claim 1, wherein said selection module for interacting with a user to select a set of predetermined initialization values when the initialization routine determines that the random number generator of the DVD video player is faulty is configured to:
   prompt the user to select a game number from a set of possible numbers, each of said numbers representing a predetermined order for presenting said puzzles during game play;
   accept input from the user related to the selected game number; and
   initialize game play according to the predetermined order for presenting said puzzles during game play associated with the selected game number.

* * * * *